US006808356B2

(12) United States Patent
Iwasaki et al.

(10) Patent No.: US 6,808,356 B2
(45) Date of Patent: Oct. 26, 2004

(54) DEVICE FOR CARRYING ARTICLE INTO AND FROM CONTAINER, METHOD FOR INTRODUCING AND DISCHARGING ARTICLE INTO AND FROM CONTAINER, AND PALLET FOR CARRYING ARTICLE

(75) Inventors: Nobuo Iwasaki, Tokai (JP); Tatsuhiko Aoki, Tokai (JP); Kouichi Tsuruta, Tokai (JP)

(73) Assignee: Toyota Steel Center Co., Ltd., Aichi (JP)

(*) Notice: Subject to any disclaimer, the term of this patent is extended or adjusted under 35 U.S.C. 154(b) by 0 days.

(21) Appl. No.: 10/017,505

(22) Filed: Dec. 18, 2001

(65) Prior Publication Data

US 2002/0094258 A1 Jul. 18, 2002

(30) Foreign Application Priority Data

Dec. 28, 2000 (JP) ........................................ 2000-403399
Apr. 27, 2001 (JP) ........................................ 2001-132402

(51) Int. Cl.$^7$ ............................................... B65D 19/44
(52) U.S. Cl. ..................... 414/392; 414/400; 193/35 SS
(58) Field of Search ................................ 414/391, 392, 414/395, 400, 517, 529, 531, 532, 535

(56) References Cited

U.S. PATENT DOCUMENTS

| 3,011,665 | A | * | 12/1961 | Wise ........................... 414/535 |
| 3,807,035 | A | | 4/1974 | Moorman et al. |
| 3,958,701 | A | | 5/1976 | Yatagai et al. ............. 214/38 C |
| 4,231,695 | A | | 11/1980 | Weston, Sr. ................... 410/69 |
| 4,732,528 | A | | 3/1988 | Good |
| 4,909,378 | A | | 3/1990 | Webb .......................... 198/721 |
| 5,082,415 | A | | 1/1992 | Hayashi ....................... 414/343 |
| 5,170,721 | A | | 12/1992 | Troth et al. |
| 5,350,048 | A | * | 9/1994 | Wylie ..................... 193/35 SS |
| 5,716,184 | A | * | 2/1998 | Lowe et al. ................. 414/400 |
| 6,382,385 | B2 | * | 5/2002 | Ransil et al. ............ 193/35 SS |
| 6,431,367 | B1 | * | 8/2002 | Satake et al. ............... 414/392 |
| 6,622,846 | B1 | * | 9/2003 | Dean ........................... 414/529 |

FOREIGN PATENT DOCUMENTS

| EP | 0 304 527 A1 | 3/1989 |
| JP | 52-68581 | 6/1977 |
| JP | 56-23126 | 3/1981 |
| JP | 62-88630 | 4/1987 |
| JP | 6-9009 | 1/1994 |
| JP | 6-64717 | 3/1994 |
| JP | 7-165337 | 6/1995 |
| JP | 62-88631 | 4/1997 |
| WO | WO 88/02732 | 4/1988 |

* cited by examiner

*Primary Examiner*—Eileen D. Lillis
*Assistant Examiner*—Thuy V. Tran
(74) *Attorney, Agent, or Firm*—Morgan Lewis & Bockius LLP

(57) ABSTRACT

The purpose of the invention is to provide a device convenient for carrying pallet loaded with article into and/or from container. The introducing device 3 is comprised of: the stage 5; the first lifting/sliding devices 13*a*, 13*b*, 13*c* and 13*d*, which support the pallet 11 to allow it to move horizontally while keeping it lifting up to the floor surface of the stage; and the second lifting/sliding devices 29*a*, 29*b*, 29*c* and 29*d*, which receive the pallet from the first lifting/sliding devices and support it to allow it to move horizontally while keeping it lifting up to the floor surface of the container 2. The introducing device 3 is possible to be used for discharging operations.

17 Claims, 26 Drawing Sheets

US 6,808,356 B2

DEVICE FOR CARRYING ARTICLE INTO AND FROM CONTAINER, METHOD FOR INTRODUCING AND DISCHARGING ARTICLE INTO AND FROM CONTAINER, AND PALLET FOR CARRYING ARTICLE

FIELD OF THE INVENTION

The present invention relates to a device for carrying various articles and a method for introducing and discharging various articles into and from container, in particular, dry container easily and speedily.

The present invention also relates to a pallet for carrying various articles into and from container, in particular, dry container.

DESCRIPTION OF THE PRIOR ART

Freight containers have been commonly used in transporting article by such transportation means as trucks, railroad cars, and ships, and those freight containers include types called dry containers. Dry containers are normally formed in rectangular box-shapes in order to be able to be loaded in transportation means easily as well as to protect article from external damage. Furthermore, box-shaped freight containers normally have only one side of their six sides, i.e., the smallest side at the rear, is provided as an opening for introducing or discharging. Therefore, in introducing the article to be transported into a dry container mounted on a container truck, it is first necessary for the article to be lifted to the floor height of the dry container using carrying equipment such as a forklift or a crane, then pushed or pulled into the dry container with the help of workers, lowered onto the floor of the dry container, and finally moved to a specified position.

However, if said article is heavy and bulky as in the case of large machines or industrial raw materials, the carrying equipment may not be capable of handling the article, so that a loading stage having the same height as the dry container floor is prepared and the article to be loaded is first placed on this stage temporarily using a crane, and then moved into the dry container using rollers and pinch bars.

On the other hand, in the case of loading heavy article carried on pallets, which are modularized based on the lengths of dry containers, e.g., 20 feet or 40 feet, it was extremely difficult to load heavy article to specified positions of the dry containers as the lengths of the containers are long and the storage positions of the pallets are physically restricted. Similarly, the work of discharging heavy article out of dry containers has been extremely difficult.

SUMMARY OF THE INVENTION

It is an object of the present invention to provide a device convenient for carrying article onto pallet into and/or from container.

It is further an object of the present invention to provide a method convenient for introducing article onto pallet into container.

It is further an object of the present invention to provide a method convenient for discharging article onto pallet from freight container.

It is further an object of the present invention to provide a pallet that improves work efficiency for introducing and discharging article into and from container, facilitates confirmation of orders of introducing article in preparation of introducing, and makes it easier to introduce and discharging even heavy and long article into and from freight container.

The invention will now be described following.

1. Device for carrying article into and from container being characterized in comprising: a stage that is positioned close to one end opening of a container placed at a specific location and has a floor surface with a height approximately equal to a height of a floor surface of said container; a stage-side displacement means that is capable of lifting up and down a pallet loaded with article to said floor surface of said stage and supporting said pallet in such a way as to allow said pallet to move horizontally while keeping said pallet lifted up to said floor surface of said stage; and a container-side displacement means that is capable of lifting up and down said pallet to said floor surface of said container and supporting said pallet in such a way as to allow said pallet to move horizontally while keeping said pallet lifted up to said floor surface of said container; wherein receiving said pallet while keeping said pallet lifted up to said floor surface of said stage or said container is possible between said stage-side displacement means and said container-side displacement means.

2. Device for carrying article into and from container according to above-mentioned 1 further comprising an external force application means for a pallet that causes said pallet, which is supported in such a way as to be able to move horizontally by said stage-side displacement means, to move toward said container-side by applying an external force.

3. Device for carrying article into and from container according to above-mentioned 1 further comprising an external force application means for a pallet that causes said pallet, which is supported in such a way as to be able to move horizontally by said container-side displacement means, to move toward said stage-side by applying an external force.

4. Device for carrying article into and from container according to above-mentioned 1 further comprising an external force application means that causes said container-side displacement means to move between said stage and said container by applying an external force to said container-side displacement means.

5. Device for carrying article into and from container according to above-mentioned 1 wherein said stage-side displacement means is a lifting/sliding device comprising a sliding member that supports said pallet in such a way as to allow said pallet to move horizontally and a lifting member that lifts said sliding member.

6. Device for carrying article into and from container according to above-mentioned 1 wherein said container-side displacement means is a lifting/sliding device comprising a sliding member that supports said pallet in such a way as to allow said pallet to move horizontally and a lifting member that lifts said sliding member.

7. Device for carrying article into and from container according to above-mentioned 5 or 6 wherein said sliding member has multiple rollers arranged in parallel to each other.

8. Device for carrying article into and from container according to above-mentioned 5 or 6 wherein said lifting member comprises an expanding member that is capable of pushing up said sliding member by expanding itself when air is introduced.

9. Device for carrying article into and from container according to above-mentioned 1 wherein said stage has said floor surface with a height approximately equal to a height of said floor surface of said container installed on the ground.

10. Device for carrying article into and from container according to above-mentioned 1 wherein said stage has said floor surface with a height approximately equal to a height of said floor surface of said container mounted on a chassis of a truck.

11. Device for carrying article into and from container according to above-mentioned 1 wherein said pallet comprises a pallet main body, a connecting means that connects said pallet main body with a pallet main body of other pallet(s), and a bottom open space, which is open in a carrying direction, underneath said pallet, and is capable of forming a pallet combination unit that approximately matches a size of a floor space of said container by connecting with other pallet(s) as needed.

12. Method for introducing article into container using said device according to above-mentioned 1, in particular, a method for introducing article into container characterized in placing a pallet preloaded with article to be transported on a floor surface of a stage, lifting up said pallet to said floor surface of said stage, moving said pallet toward a container placed at a specific location while keeping said pallet lifted up to said floor surface of said stage, and finally lowering said pallet to a floor surface of said container.

13. Method for introducing article into container according to above-mentioned 12 wherein said pallet is moved while keeping said pallet lifted up to said floor surface of said stage by multiple rollers, which are arranged in parallel to each other and pushed upward when compressed air is introduced.

14. Method for introducing article into container according to above-mentioned 12 wherein said pallet comprises a pallet main body and a connecting means so that said pallet main body can connect with a pallet main body of other pallet(s) thus allowing to form a pallet combination unit by connecting with other pallet(s) that approximately matches a size of a floor space of said container, and said pallet combination unit is placed on said floor surface of said stage.

15. Method for discharging article from container using said device according to above-mentioned 1, in particular, a method for discharging article from container characterized in placing a container at a specified position relative to a stage, lifting up a pallet loaded with article to a floor surface of said container, moving said pallet toward said stage while keeping said pallet lifted up to said floor surface of said container, and finally lowering said pallet to a floor surface of said stage.

16. Method for discharging article from container according to above-mentioned 15 wherein said pallet is moved while keeping said pallet lifted up to said floor surface of said container by multiple rollers, which are arranged in parallel to each other and pushed upward when compressed air is introduced.

17. Method for discharging article from container according to above-mentioned 15 wherein said pallet comprises a pallet main body and a connecting means so that said pallet main body can connect with a pallet main body of other pallet(s) thus allowing to form a pallet combination unit by connecting with other pallet(s) that approximately matches a size of a floor space of said container, and said pallet combination unit is placed on said floor surface of said container.

18. Pallet for carrying article, in particular, a pallet comprising a pallet main body, a connecting means that connects said pallet main body with a pallet main body of other pallet(s), and a bottom open space, which is open in a carrying direction, underneath said pallet, and is capable of forming a pallet combination unit that approximately matches a size of a floor space of said container by connecting with other pallet(s) as needed.

19. Pallet for carrying article according to above-mentioned 18 wherein said connecting means is provided in a corner of an article-carrying surface of said pallet main body.

20. Pallet for carrying article according to above-mentioned 18 wherein said bottom open space is a space for storing a lifting/sliding device for moving said pallet while keeping said pallet lifted up.

The device for carrying article into and from container according to this invention makes it possible to introduce and/or discharge various kinds of article carried on pallet into and/or from freight container efficiently. Moreover, since the fastening and/or unfastening of article to pallets can be done outside the container, the otherwise cumbersome fastening and/or unfastening of article or the like inside the container can be reduced to a necessary minimum. Further, it makes it possible to prepare article in advance of introducing, realizing a more efficient introducing work of article.

The method for introducing article into container according to this invention makes it possible to introduce various kinds of article carried on pallets into container efficiently. Moreover, it makes it possible to prepare article in advance of introducing, realizing a more efficient introducing of article. Further, since the fastening of article to pallets can be done outside the container, the otherwise cumbersome fastening of article or the like inside the container can be reduced to a necessary minimum.

The method for discharging article from container according to this invention makes it possible to discharge various kinds of article carried on pallet from container efficiently. Moreover, since the unfastening of article from pallet can be done outside the container, the otherwise cumbersome unfastening of article or the like inside the container can be reduced to a necessary minimum.

The pallet for carrying article according to this invention makes it possible to handle various kinds of article by choosing connected or disconnected pallets, and as a result, it makes it possible to introduce and discharge article into and from container efficiently if this pallet is used. Moreover, since the pallet for article can be placed without wasting space in the container, the otherwise cumbersome fastening of pallet or the like inside the container can be reduced to a necessary minimum.

DETAILED DESCRIPTION OF THE INVENTION

Figure 1:
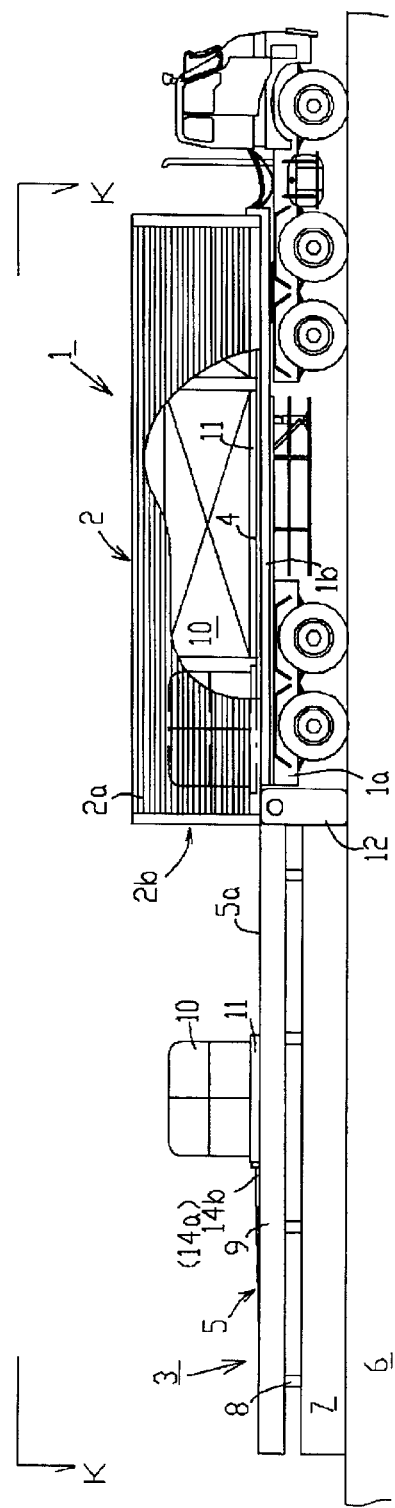
FIG. 1 shows the introducing device according to the first embodiment and a partially broken side view of a container truck.

The invention will now be described in detail.

(The Device for Carrying Article into and from Container)

The device for carrying article into and from container according to the present invention is characterized in comprising: a stage that is positioned close to one end opening of a container placed at a specific location and has a floor surface with a height approximately equal to a height of a floor surface of said container; a stage-side displacement means that is capable of lifting up and down a pallet loaded with article to said floor surface of said stage and supporting said pallet in such a way as to allow said pallet to move horizontally while keeping said pallet lifted up to said floor surface of said stage; and a container-side displacement means that is capable of lifting up and down said pallet to said floor surface of said container and supporting said pallet in such a way as to allow said pallet to move horizontally while keeping said pallet lifted up to said floor surface of said container; wherein receiving said pallet while keeping said pallet lifted up to said floor surface of said stage or said container is possible between said stage-side displacement means and said container-side displacement means.

Another device for carrying article into and from container according to the present invention is characterized in further comprising an external force application means for a pallet that causes said pallet, which is supported in such a way as to be able to move horizontally by said stage-side displacement means, to move toward said container-side by applying an external force.

Yet another device for carrying article into and from container according to the present invention is characterized in further comprising an external force application means for a pallet that causes said pallet, which is supported in such a way as to be able to move horizontally by said container-side displacement means, to move toward said stage-side by applying an external force.

Yet another device for carrying article into and from container according to the present invention is characterized in further comprising an external force application means that causes said container-side displacement means to move between said stage and said container by applying an external force to said container-side displacement means.

The "container" include so-called "flat container" that do not have ceilings and so-called "open-top container" that have open ceiling capabilities, but are preferably so-called "dry container" that have openings only at their rear ends, which happen to be the smallest sides, used as entrances and exists for article. Dry container is not only the most popular kind of containers, but are also the most economical, are easy to maintain, and have excellent sealing capabilities. These considerations are applicable in the inventions described below.

The "article" can be anything as long as it can fit into container in terms of weight, width, height and type of material, e.g., machinery (automotive parts, electrical products, etc.), concrete piles, flexible containers, fruits, and miscellaneous merchandise. In particular, these include heavy and bulky article, such as large machine tools, long products, coiled products, large glass products, masonry products, automobiles, press dies, etc. Also, these include such heavy article as textile machinery and machine tools weighing anywhere from 100 kg up to 50 tons. The target article is more commonly 1 ton through 20 tons. When dealing with article that contains coiled products, it is preferable to cross the axes of the coiled products with the direction of transportation (longitudinal direction) of a container. This is to prevent the coiled products from coming loose in the direction of transportation while the container is being transported. These considerations are applicable also in the inventions described below.

While the "pallet" can be of any size depending on the article to be carried, it is most preferable to have them modularized based on the lengths of the floor of the container so that the article can fill up the space of the freight container most efficiently. One possible type of modularized pallet has a size approximately equal to that of the floor of the container, and such a pallet is used singularly. It is also possible to use a combination of uniform pallet sizes connected together, which jointly assimilate the size of the container floor. Such a combination of pallets can consist of pallets each having a longer side (or a shorter side) with a length equal to a half, a third, a fourth, a fifth, etc., of the length of the longer side of the freight container used. In the case of a container with a total length of 20 feet, it is preferable to use pallets with a length equal to a fourth of the total length of the container. In case of a container with a total length of 40 feet, it is preferable to use pallet with a length equal to an eighth of the total length of the container. This is so that a pallet can have more general usefulness. It is also possible to combine pallets having a surface area of ⅙, ⅖, and ⅜ or ⅔ and ⅗ of the container's area to form a combination pallet. It is also possible to combine pallets each of which having a side with a length equal to a third of the length of the longer side of the freight container and another side with a length equal to a half of the length of the shorter side of the freight container, i.e., pallet having sides with lengths equal to evenly divided partial dimensions of the two sides of the container. While this pallet can be structured in various ways, it is preferable that bottom support beams are provided at the bottom in the article carrying direction so that the pallet are supported by the stage floor backed by the beams when the stage-side and container-side displacement means are not operating, while the pallet is supported by the stage-side or container-side displacement means directly when the stage-side and container-side displacement means are operating. This arrangement is intended for introducing article into container more easily and rapidly. These considerations are applicable to the following inventions described below.

The "stage-side displacement means" can be a lifting/sliding device equipped with a sliding member that supports the pallet loaded with said article in such a way as to allow the pallet to move horizontally and a lifting member that moves the sliding member up and down. Thus, even a pallet loaded with an extremely heavy article such as a large machine can be smoothly moved between the container and the stage. Moreover, in order to enhance its smooth motion, the "sliding member" can be equipped with multiple rollers that are arranged in parallel to each other. The "lifting member" can have an expanding member that is capable of pushing up said sliding member by expanding itself when air is introduced. The stage-side displacement means can be a lifting/sliding device equipped with multiple rollers, a supporting member that supports the rollers rotatably, a base that supports the supporting member in such a way as to allow the supporting member to move up and down, and an expanding member provided between the base and the supporting member.

The "container-side displacement means" can be a lifting/sliding device equipped with a sliding member that supports the pallet loaded with article in such a way as to allow the pallet to move horizontally and a lifting member that moves the sliding member up and down. Thus, even a pallet loaded with an extremely heavy article such as a large machine can be smoothly moved between the container and the stage. Moreover, in order to enhance its smooth motion, the "sliding member" can be equipped with multiple rollers that are arranged in parallel to each other. The "lifting member" can have an expanding member that is capable of pushing up said sliding member by expanding itself when air is introduced. The container-side displacement means can be a lifting/sliding device equipped with multiple rollers, a supporting member that supports the rollers rotatably, a base that supports the supporting member in such a way as to allow the supporting member to move up and down, an expanding member provided between the base and the supporting member. The container-side displacement means can be a lifting/sliding device equipped with multiple rollers, a supporting member that supports the rollers rotatably, a base that supports the supporting member in such a way as to allow the supporting member to move up and down, an expanding member provided between the base and the supporting member, and traveling wheels provided on the base that enable the container-side displacement means to travel between the container and the stage. Consequently, the lifting/sliding device as the container-side displacement means can move smoothly between the freight container and the stage. Moreover, the traveling wheels can be installed across a suspension mechanism in order to allow the wheels to travel preventing the rollers from being introduced. Thus, improved traveling linearity can be achieved for the container-side displacement means even if there are some irregularities to the container floor. Moreover, said traveling wheels are such that the leading wheels in the traveling direction are provided with a toe-in camber angle. Therefore, even when the leading wheels rise above the surface due to irregularities of the container floor, stable traveling can be achieved as a result of supports provided by the trailing traveling wheels.

The "external force application means for a pallet" can be a pushing device in order to be able to push it. The pushing device has a proximal end, which is supported by the stage, and a distal end, which can be abutted to said pallet. The external force application means for a pallet can be a pulling device in order to be able to push it. The pulling device has a proximal end, which is supported by the stage, and a distal end, which can be abutted to the pallet. The external force application means for a pallet can be a pushing/pulling device in order to be able to push and pull it. The pushing/pulling device has a proximal end, which is supported by the stage, and a distal end, which can be abutted to the pallet.

The external force application means for a pallet can be equipped with an extendible boom and a hydraulic cylinder that extends or contracts the boom, and the distal end of the boom can have a latching unit that latches with the pallet. Further, the external force application means for a pallet can be equipped with a carriage that can travel on the stage floor and the carriage can have a latching unit that can latch with the pallet. Moreover, the external force application means for a pallet can be equipped with a drive unit and an endless member that circulates driven by the drive unit, wherein the endless member can have a latching unit that latches with the pallet. The drive unit can be a drive motor, a hydraulic cylinder, etc. The endless member can be a conveyor belt, a chain, etc. The external force application means for a pallet can be installed in the bottom storage space provided in the lifting/sliding device, i.e., the container-side displacement means, or at the opposite end of the stage away from the container, or within the stage.

The "external force application means" can also be a push-pulling device that moves the container-side displacement means to move back and forth between the container and the stage. The push-pulling device has a proximal end, which is supported by the stage, and the distal end of said push-pulling device is abutted to the container-side displacement means in order to be able to push it. The external force application means can be equipped with an extendible boom and a hydraulic cylinder that extends or contracts the boom, and the distal end of the boom can have a latching unit that latches with lifting/sliding device. Further, the external force application means can be equipped with a carriage that can travel on the stage floor and the carriage can have a latching unit that can latch with the lifting/sliding device. Moreover, said external force application means can be equipped with a drive unit and an endless member that circulates driven by the drive unit, wherein the endless member can have a latching unit that latches with the lifting/sliding device. The drive unit can be a drive motor, a hydraulic cylinder, etc. The endless member can be a conveyor belt, a chain, etc. Said external force application means can be installed in the bottom storage space provided in the lifting/sliding device, i.e., the container-side displacement means, or at the opposite end of the stage away from the container, or within the stage. The external force application means for a pallet can function as the external force application means.

The "stage" can be constructed arbitrarily as long as it has a height approximately equal to that of the container floor and can be used for placing the article, and can be to the ground or floor, or sunk into the ground or floor, or can be supported by the wall. In other words, the stage can have a floor surface with a height approximately equal to that of the floor surface of the container that is placed on the ground. Thus, even in a case of introducing and/or discharging a large quantity of various articles, the introducing and/or discharging work can be efficiently carried out. The stage can have a floor surface with a height approximately equal to that of the floor surface of the container that is mounted on the truck chassis.

The "pallet" can be equipped with a pallet main body, a connecting means that connects the pallet main body with a pallet main bodies of other pallets, and a bottom open space, which is open in the article carrying direction, underneath the pallet, and is capable of forming a pallet combination unit that approximately matches a size of a floor space of the container by connecting with other pallets as needed. Thus, it is possible to use pallets connected or unconnected as needed depending on the size and/or type of article, thereby realizing a pallet with high usefulness for general purpose with a necessary minimum number of varieties (module types).

The device for introducing article into container comprises: a stage that is positioned close to an opening at one end of a container placed at a specific location and has a floor surface with a height approximately equal to the height of a floor surface of said container; a stage-side displacement means that supports a pallet loaded with article to be placed on said stage in such a way as to allow said pallet to move horizontally while keeping said pallet lifted up to said floor surface of said stage; and a container-side displacement means that receives said pallet from said stage-side displacement means, supports said pallet in such a way as to allow said pallet to move horizontally while keeping said pallet lifted up to said floor surface of said container, and lowers said pallet on said floor surface of said container.

The device for discharging article from freight containers comprises: a stage that is positioned close to an opening at one end of a container placed at a specific location and has a floor surface with a height approximately equal to the height of a floor surface of said container; a container-side displacement means that lifts a pallet loaded with article placed on said container and supports said pallet in such a way as to allow said pallet to move horizontally while keeping said pallet lifted up to said floor surface of said container; and a stage-side displacement means that receives said pallet from said container-side displacement means and supports said pallet in such a way as to allow said pallet to move horizontally while keeping said pallet lifted up to said floor surface of said stage.

(The Method for Introducing Article into Freight Container)

Method for introducing article into container according to the present invention is a method for introducing article into container using above-mentioned carrying device characterized in placing a pallet preloaded with article to be transported on a floor surface of a stage, lifting up said pallet to said floor surface of said stage, moving said pallet toward a container placed at a specific location while keeping said pallet lifted up to said floor surface of said stage, and finally lowering said pallet to a floor surface of said container.

The pallet is moved while it is kept lifted from the floor surface of the stage by multiple rollers, which are arranged in parallel to each other and pushed upward when compressed air is introduced. Thus, the pallet loaded with the article can be moved smoothly between the container and the stage. The pallet comprises a pallet main body and a connecting means so that said pallet main body can connect with a pallet main bodes of other pallets thus allowing to form a pallet combination unit by connecting with other pallets that approximately matches the size of a floor space of the container, and the pallet combination unit can be prepared on the stage. Thus, even heavy and bulky article can be efficiently introduced into container.

(The Method for Discharging Article from Freight Container)

Method for discharging article from container according to the present invention is a method for discharging article from container using above-mentioned carrying device characterized in placing a container at a specified position relative to a stage, lifting up a pallet loaded with article to a floor surface of said container, moving said pallet toward said stage while keeping said pallet lifted up to said floor surface of said container, and finally lowering said pallet to a floor surface of said stage.

The pallet is moved while it is kept lifted from the floor of said container by multiple rollers, which are arranged in parallel to each other and pushed upward when compressed air is introduced. Thus, the pallet loaded with the article can be moved smoothly between the container and the stage. The pallet comprises a pallet main body and a connecting means so that said pallet main body can connect with a pallet main bodes of other pallets thus allowing to form a pallet combination unit by connecting with other pallets that approximately matches a size of a floor space of the container, and the pallet combination unit can be placed on the container. Thus, even heavy and bulky article can be efficiently discharged from container.

(The Pallet that has a Connecting Means)

Pallet for carrying article according to the present invention is a pallet for carrying article into and from container characterized in having a pallet main body, a connecting means that connects said pallet main body with a pallet main body of other pallet(s), and a bottom open space, which is open in a carrying direction, underneath said pallet, and is capable of forming a pallet combination unit that approximately matches a size of a floor space of said container by connecting with other pallet(s) as needed.

The "connecting means" can be equipped with a block base member to be fastened on a pallet and a connecting member that connects the block base member with the block base member of another pallet. The connecting member can consist of a plate-like member that is used as a bridge between said block base members and fasteners that fasten said plate-like members. The connecting member can also consist of a fitting member that can be fitted into a latching part formed on each of the block base members. Further, the connecting member can consist of a chain member that can be latched to a latching part formed on each of said block base members. Furthermore, the block base member is preferable to have a hook-like member, so that such a hook-like member can be used for transporting pallet with a crane, or for fastening article (e.g., for lashing work using holding nets, fixing ropes, etc.). While said connecting means can be provided at an arbitrary position of the pallet, it is more preferable to be provided at the corners of the pallet main body on the article-carrying surface in order to facilitate the connection work and to maximize useful space of the article-carrying surface. Said connection means should not be protruding from the periphery of the pallet when installed on the pallet.

Although the pallet can assume various shapes, it is preferable that the pallet main body have multiple beam-like base members arranged in the direction of carrying article underneath, and said bottom open space is formed between said multiple beam-like base members, in order to move the pallet smoothly by using the sliding member and the lifting member as described later.

Although the "bottom open space" can be used as a space for storing or inserting transport means for transporting the pallet, or a for fastening the fastening members in order to fasten the article on the pallet, or for any other purpose, said bottom open space can also be used as a space for storing a sliding member for transferring the pallet under a lifted condition and a lifting member that moves the sliding member up and down.

The pallet preferably consists of multiple carrying members that are perpendicular to the carrying direction of the article and multiple beam-like base members that are provided underneath the carrying members and are aligned in the carrying direction, wherein those two groups of members form grid-like patterns, so that the strength of the pallet is secured while reducing the pallet's weight. Also, it is preferable that the pallet can move in parallel to its article carrying surface and is equipped with a fixture that restricts its movement in the direction perpendicular to its article carrying surface (vertical direction), so that the anchor frame of the article (e.g., machine tools) can be affixed to the pallet main body with bolts using this fixture. It is also preferable that the pallet is equipped with receptacles that can be detachably mounted for article. By preparing various forms of receptacles to fit various kinds of article, it is possible to use the same pallet to carry various kinds of article. The pallet can have weight bearing members and spacers underneath. These weight bearing members and spacers can serve as a support for the weight of the article between the pallet and the sliding device as well as a guide rail for the sliding device.

(The Structure of the Pallet that has a Connecting Means)

The structure of the pallet can consist of above-mentioned pallet and article being loaded on the pallet.

The structure of the pallet can consist of above-mentioned pallet as well as a sliding member and a lifting member that lifts said sliding member, both of which are stored in the bottom open space of the pallet.

The structure of the pallet can consist of article being loaded on the pallet.

Said lifting member can consist of an expanding member that expands pneumatically. Said sliding member can have multiple rollers.

(The Pallet Combination Unit)

The pallet combination unit can consist of above-mentioned multiple pallets, wherein adjacent pallets are connected by the connecting means.

(The Structure of the Pallet Combination Unit)

The structure of the pallet combination unit can consist of above-mentioned pallet combination unit and the article being loaded on the pallet combination unit.

The structure of the pallet combination unit can consist of above-mentioned pallet combination unit as well as a sliding member and a lifting member that lifts the sliding member, both of which are stored in the bottom open space of the multiple pallets that constitute the pallet combination unit.

The structure of the pallet combination unit can be equipped with the article being loaded on the pallet combination unit.

The lifting member can consist of an expanding member that expands pneumatically. The sliding member can have multiple rollers.

(The Storage Structure of the Pallet Combination Unit)

The storage structure of the pallet combination unit for a container is a structure for mounting the pallet combination unit to the container consisting of above-mentioned pallet combination unit, the container that contains the pallet combination unit, and the article being loaded on the pallet combination unit, wherein the pallet combination unit has a size that approximately matches that of the internal space of the container.

DESCRIPTION OF THE PREFERRED EMBODIMENTS

The following are detailed descriptions of the invention using preferred embodiments with reference to the accompanying drawings.

(First Embodiment)

The first embodiment describes introducing article into a dry container mounted on the chassis of a container truck. A dry container will be abbreviated to container in some parts of the following description.

(1) Structure of the Introducing Device

As shown in FIG. 1, a dry container 2 is mounted on the chassis of a large container truck 1. The ground in the vicinity of a introducing device 3 according to the present invention is prepared in such a way that the rear part 1a of said container truck 1 can be brought close to the introducing device. Said introducing device 3 essentially consists of a stage 5 with a floor 5a having a height approximately equal to that of the floor 4 of the container 2 mounted on said container truck 1, a stage-side displacement means and a container-side displacement means, which are to be described later.

The container discussed in this embodiment is a dry container with a total length of 40 feet.

The stage 5 consists of a foundation unit 7, which is installed on the ground 6, a support unit 8 built on said foundation unit 7, and a floor unit 9 installed as a flat plate on said support 8, so that article 10 transported by a crane or other type of large transportation equipment can be temporarily set on it via a pallet 11 of a modularized structure. It is possible to have a lifting means on said supporting member 8 in order to fine tune the height of the floor 5a of the stage 5 to match the height of the floor 4 of said container 2, and also to provide a supporting member 12 at the floor 9 in order to support the rear part 2a of the container from underneath when introducing and discharging article.

Figure 2:
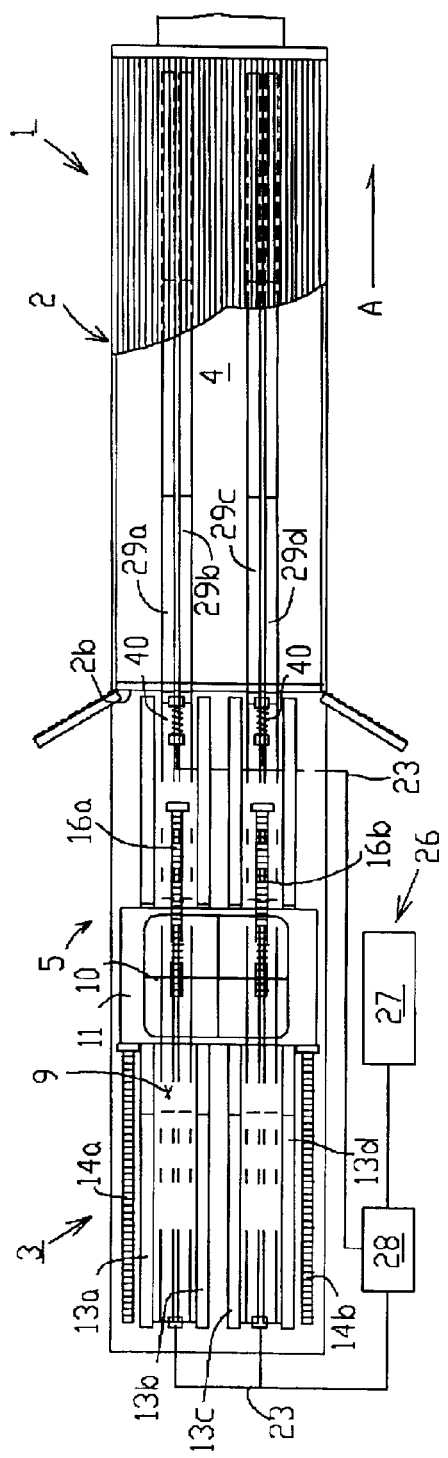
FIG. 2 is a partially broken plan view in the K—K arrow direction in FIG. 1.
Figure 3:
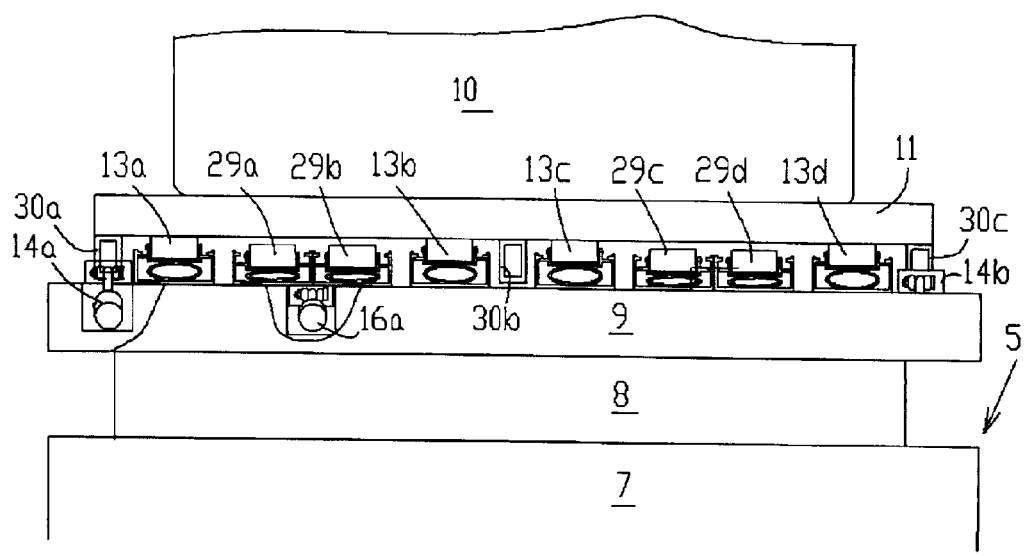
FIG. 3 is a partially broken side view showing the stage-side displacement means and the container-side displacement means of the stage according to the first embodiment.

As shown in FIG. 2 and FIG. 3, four units of first lifting/sliding devices 13a, 13b, 13c and 13d are laid out at an equal distance on said floor 9 parallel to the longitudinal direction (direction of arrow A) of the container 2, on the outside of which are laid out, in addition, first pushing devices 14a and 14b along the side edge of the floor 9.

Figure 4:
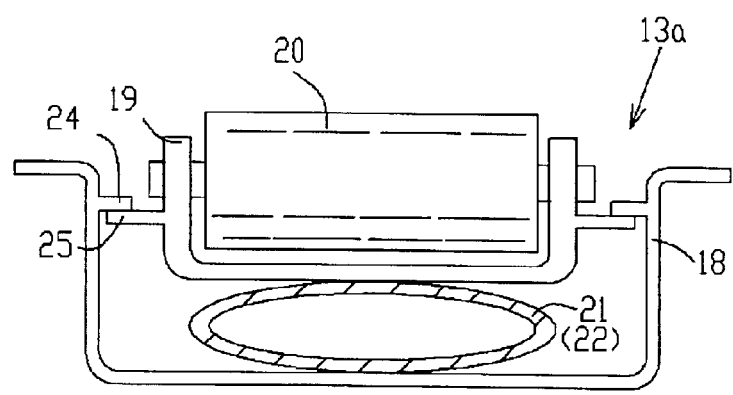
FIG. 4 is a front view of a roller in a lifted condition in the lifting/sliding device according to the first embodiment.
Figure 5:
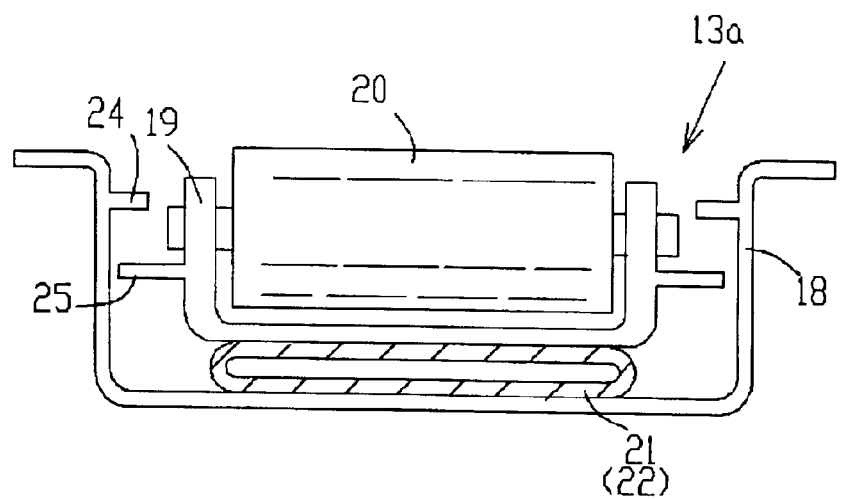
FIG. 5 is a front view of the same roller in a lowered condition.
Figure 6:
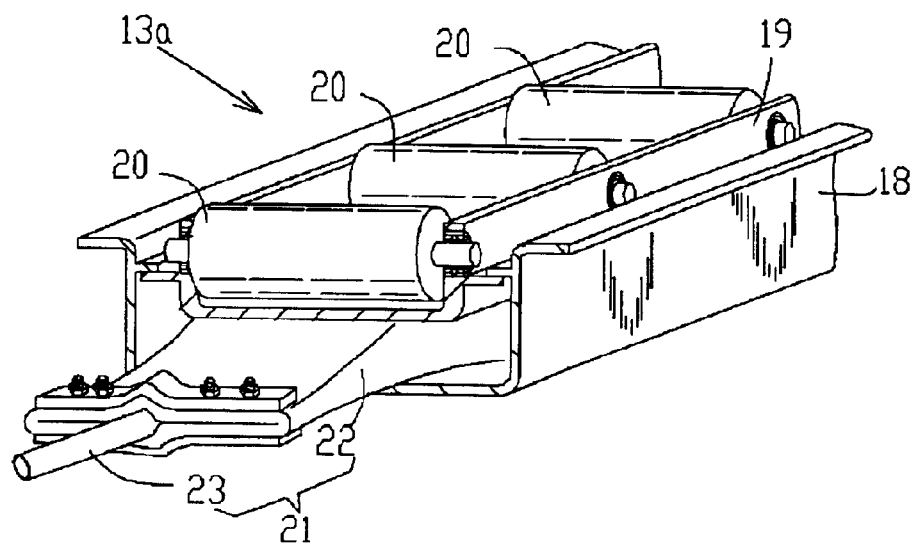
FIG. 6 is a partially broken perspective view of essential parts of said lifting/sliding device.

Said first lifting/sliding device 13a is a device consisting of one or more units with a specified length connected in series that are placed on said floor 9 in order to move the article 10 toward the container 2. In the device consisting of a single unit, as shown in FIG. 4, FIG. 5 and FIG. 6, it consists of a base 18 having a substantially U-shaped vertical cross section, a supporting member 19 having a similar cross section that is to be dropped into the base 18, multiple rollers 20 that are arranged parallel to each other at a fixed interval and pivotally supported by shafts inside said supporting member 19, and an expanding member 21 that functions as a lifting member to be installed between said base 18 and said supporting member 19. Said expanding member 21 consists of a tube 22, which is reinforced by synthetic fiber cords, and a vent tube 23 that sends compressed air into said tube 22. It expands to push up said supporting member 19 as shown in FIG. 4 when compressed air is introduced into the tube 22, and it shrinks due to the weight of the supporting member 19 and the roller 20 to lower the supporting member 19 when compressed air is vented as shown in FIG. 5.

Plate-like stoppers 24 are provided on the inside of said base 18 protruding horizontally and engaging plates 25 with a shape corresponding to said stopper 24 are provided on the outside of said supporting member 19, so that when the supporting member 19 rises as said tube 22 expands, said engaging plates 25 abut with the stoppers 24, thus limiting the height said supporting member 19 can rise. Other first lifting/sliding devices 13b, 13c and 13d are structured similar to that of the first lifting/sliding device 13a.

The first lifting/sliding devices 13a, 13b, 13c and 13d can be said to constitute the "stage-side displacement means" in the first embodiment.

Said stage 5 also has a pneumatic control system 26 connected to said vent tube 23 as shown in FIG. 2, and the system controls the supply of compressed air from compressor 27 or an air tank to said tube 22 via the control box 28.

Said first pushing devices 14a and 14b are used for moving the article 10 to the container 2 by means of pushing the pallet 11 that carries the article 10 when the article 10 is lifted by actuating said expanding member 21, and their proximal ends are fastened to said floor 9, while their distal ends are extendable to such a degree as to be able to push the pallet 4 to the inner most position of the container 2. Such devices can be materialized by means of hydraulic cylinders, screws, chains or wires, where at least a portion of the pallet 11 is latched to.

Thus, said first pushing device 14a and 14b can be said to constitute the "external force application means for a pallet."

If the rollers 20 of said first lifting/sliding devices 13a, 13b, 13c, and 13d are of a self-propelled type, there is no need to separate the first pushing devices 14a and 14b from the first lifting/sliding devices 13a, 13b, 13c, and 13d as in the abovementioned embodiment, and rotary drive sources can be built into the first lifting/sliding devices 13a, 13b, 13c, and 13d and said rotary drive sources provide the same function as that of the first pushing devices 14a and 14b on said rollers 20. In this case, the rollers 20 are used appropriately that at least one of them is self-propelled by means of a drive motor (hydraulic, pneumatic, or electric motor, etc.), or driven by an electric motor installed outside. Since the rise and fall of the rollers 20 are actuated pneumatically, the motor is preferably an air motor using pneumatic pressure as the rotary drive source of said roller 20.

As shown in FIG. 2, second pushing devices 16a and 16b having essentially the same structure and function as those of the first pushing devices 14a and 14b are provided substantially parallel to each other on the floor 9 between a pair of the first lifting/sliding devices 13a and 13b as well as between another pair of first lifting/sliding devices 13a and 13b respectively. However, they are different from the first pushing devices 14a and 14b in that they are arranged at positions that enable them to push second lifting/sliding devices (to be described later) that are arranged on the floor 4 of the stage 5, as well as having a pull function to be able to pull out the second lifting/sliding devices after finishing the function mentioned above on said floor 4.

Thus, said second pushing devices 16a and 16b of the first embodiment can be said to constitute the "external force application means" according to the present invention.

Next, as shown in FIG. 2, four units of second lifting/sliding device 29a, 29b, 29c, and 29d are placed at positions offsetting the lines extending from said first lifting/sliding devices 13a, 13b, 13c, and 13d in two pairs on the floor 4 of the container 2, each pair consisting of two closely placed units, and all units in parallel longitudinally with each other, wherein said devices receive the article 10 from the first lifting/sliding devices 13a, 13b, 13c, and 13d and move the article to a specified position on the floor 4 while maintaining the article slightly higher than the floor 4, and then lower the article again. Consequently, these devices have essentially identical structures and functions as those of the first lifting/sliding devices 13a, 13b, 13c, and 13d, and consist of base 18, supporting members 19, rollers 20, and expanding members 21 (lifting members) as shown in FIG. 4, FIG. 5 and FIG. 6, but are different on the following points.

The second lifting/sliding device 29a, 29b, 29c, and 29d are equipped with quick joints 40 for quickly connecting and disconnecting the vent tubes 23. When the second lifting/sliding devices 29a, 29b, 29c, and 29d are in standby positions on the stage 5 (shown by phantom lines in FIG. 2), the vent tubes 23 are blocked. However, the vent tubes 23 become capable of passing air connected to the air supply by the quick joints 40 when the devices are in the operating positions (shown by solid lines in FIG. 2). It is also possible to use the vent tubes 23 made of flexible rubber tubes reinforced by synthetic fibers so that tubes can always pass air without using the quick joints 40.

Thus, the second lifting/sliding devices 29a, 29b, 29c, and 29d of the second embodiment can be said to constitute the "container-side displacement means." according to the present invention.

More preferably, said base 18 is provided with rollers for transfer in order to make it easier for the second lifting/sliding devices 29a, 29b, 29c, and 29d to travel over the floor 4 pushed by the second pushing devices 16a and 16b, and an elastic member is provided between said base 18 and the roller shaft in order to prevent the weight of the article 10 from causing concentration of the load on said rollers and damaging said floor 4 by allowing said rollers to be exposed on the bottom surface of the base 18 when rollers are under only the weight of the second lifting/sliding devices 29a, 29b, 29c, and 29d, and to be retracted inside the base 18 when rollers are also under the weight of the article 10. Moreover, guide means (guide rollers, guide rails, etc.) can be provided for guiding the second lifting/sliding devices 29a, 29b, 29c, and 29d in order to make the positioning of the second lifting/sliding devices 29a, 29b, 29c, and 29d relative to the floor 4 of the container 2. In particular, in the process of moving the second lifting/sliding devices 29a, 29b, 29c, and 29d from the stage 5 to the inside of the container 2, it is preferable that the guide means provided at the leading edge of the second lifting/sliding devices 29a, 29b, 29c, and 29d are to be guided by the side of the bottom support beams 30a, 30b and 30c of the pallet 11. This is so that such a guide means can be constituted less expensively and easily using a part of the existing pallet 11.

Figure 7:
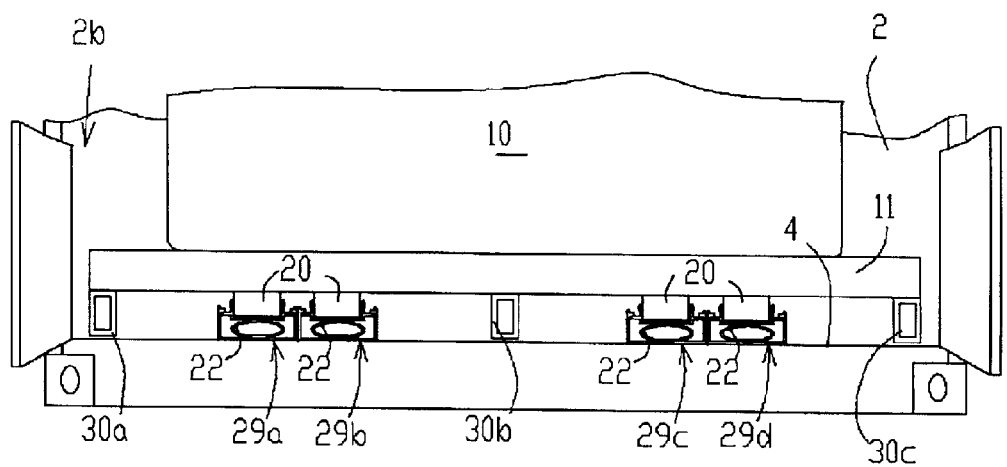
FIG. 7 is a side front of essential parts when a pallet is lifted above the floor of the container.

In order for the introducing device 3 according to the present invention thus constituted to be functional, said pallet 11 also has to have a specific structure to match the function of the introducing device 3. Therefore, as shown in FIG. 7, said pallet 11 for the purpose of the invention is equipped with three bottom supporting beams 30a, 30b ad 30c arranged on the bottom surface of the pallet in the direction of the motion of said article 10 (direction perpendicular to the sheet showing FIG. 7). The depth dimension of the pallet 11 is set to a dimension obtained by dividing the depth dimension of the container 2 into approximately four equal parts and the width dimension of the pallet 11 is set to approximately equal the width of the container 2.

Figure 8:
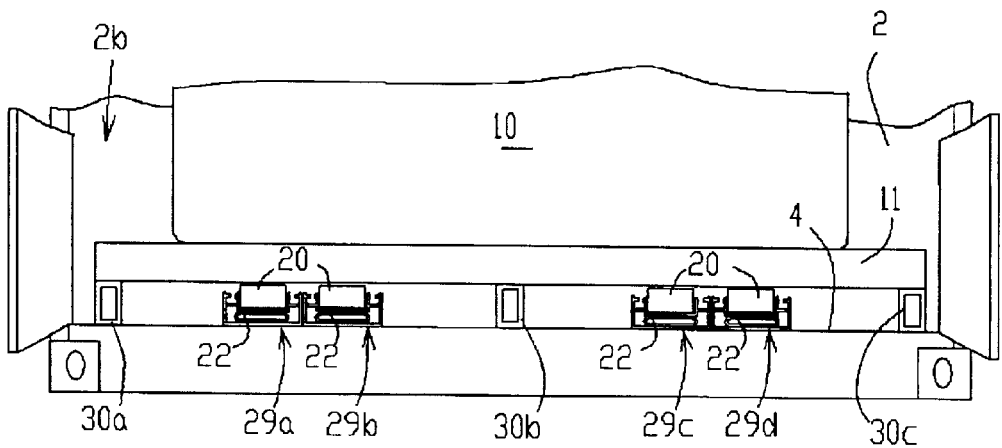
FIG. 8 is a side front of essential parts when said pallet is lowered to the floor of the container.

When the second lifting/sliding devices 29a, 29b, 29c, and 29d operate on the container 2, the article 10 is directly supported by the second lifting/sliding devices 29a, 29b, 29c, and 29d, so that the bottom supporting beams 30a, 30b and 30c are slightly above the floor 4 to prevent the floor 4 does from obstructing the motion of the article 10. On the contrary, when said second lifting/sliding devices 29a, 29b, 29c, and 29d are not in operation, the pallet 11 directly supports the article 10 via said bottom supporting beams 30a, 30b and 30c on the floor 4 as shown in FIG. 8. Therefore, the second lifting/sliding devices 29a, 29b, 29c, and 29d are not in contact with the pallet 11, so that the second lifting/sliding devices 29a, 29b, 29c, and 29d can be pulled out from underneath the pallet 11. Said bottom supporting beams 30a, 30b and 30c function the same way when said first lifting/sliding devices 13a, 13b, 13c, and 13d operate on the stage 5.

(2) Introducing Operation Using the Introducing Device

As shown in FIG. 1, the container truck 1 is backed up until the opening 2b of its back end approaches the leading edge of the introducing device 3 and also the floor 4 of the container 2 is about the same height as the floor 5a of the stage 5. Next, the second lifting/sliding devices 29a, 29b, 29c, and 29d on the stage 5 are pushed into the opening 2b of the container 2 by means of the second pushing devices 16a and 16b to set the devices in the operating positions (shown in FIG. 2). At this point, the rear edges of the second lifting/sliding devices 29a, 29b, 29c, and 29d and the leading edges of the first lifting/sliding devices 13a, 13b, 13c, and 13d provided on the stage 5 should be slightly overlapping each other as viewed from the width direction of the container 2 in the horizontal plane. The pallet 11 carrying article 10 can be smoothly moved regardless of whether the two edges are overlapped or not. Under this condition, the vent tubes 23 are connected with the quick joints 40 and create an air supply to the expanding members 21.

Next, the article 10 is laid on the stage 5 via the pallet 11. An introduction of compressed air into the expanding members 21 of the first lifting/sliding devices 13a, 13b, 13c, and 13d causes the expanding member to expand in order to make the pallet 11 rise above the floor 5a of the stage 5 as shown in FIG. 3. Similarly, an introduction of air into the expanding members 21 of the second lifting/sliding devices 29a, 29b, 29c, and 29d causes these to expand (shown in FIG. 7). From this condition, said pallet 11 is pushed by means of the first pushing device 14a and 14b to move to the opening 2b of the container 2 as shown in FIG. 2. After confirming that the pallet 11 has crossed over to the second lifting/sliding devices 29a, 29b, 29c, and 29d, the pallet 11 is moved to a specified position inside the container 2, and retracts the first pushing devices 14a and 14b. Next, similar operations are repeated for the remaining article 10. When the introducing of article 10 is completed, air is vented from the first lifting/sliding devices 13a, 13b, 13c, and 13d and the second lifting/sliding devices 29a, 29b, 29c, and 29d to lower their rollers 20. Thus, all of articles 10 on the pallets 11 are introduced onto the specified positions of the container 2.

Then, the quick joints 40 are disconnected and the second pushing devices 16a and 16b are retracted to pull back the second lifting/sliding devices 29a, 29b, 29c, and 29d toward the stage 5 side, thus completing the series of introducing operations of the article 10 into the container 2. The sequence of the above operations can be modified as long as the introducing of the article 10 to the specified position of the container 2 is attained.

(3) The Effects of the First Embodiment

Thus, the article 10 can be easily and quickly introduced into the container 2 with the modularized pallet 11 when using the introducing device 3 according to the present invention. In particular, the large, heavy and bulky article that has been conventionally impossible to introduce using such a general-purpose pallet 11 can now be efficiently introduced thanks to the invention. Moreover, even in the case of article consisting of multiple small items, these can be introduced by packing them on the pallet outside the container in advance, improving the efficiency of the consolidation and introducing of article substantially. Since the modularized pallet 11 is used for the container 2, it is possible to introduce the article 10 without wasting space in the container 2 and also provides the effect of preventing article shifting on the pallet 11 during transportation of the container 2. Since the lifting amount of the pallet 11 by the roller 20 is only approximately 15 mm, the article 10 can be introduced to the capacity limit of the container 2.

Moreover, since the fastening of the article 10 to the pallet 11 can be done on the stage 5 and the otherwise cumbersome fastening of the article 10 inside the container 2 is not necessary, the introducing of the article 11 can be carried out more efficiently. Further, since the article 10 to be introduced into the container 2 can be prepared on the stage 5 or in the vicinity of the stage 5, the introducing of the article 10 can be carried out more efficiently.

The present invention can be implemented in various other embodiments according to purposes and applications within the concept of the present invention without being restricted by the embodiment described above. For example, by properly operating the first lifting/sliding devices 13a, 13*b*, 13*c*, and 13*d*, the second lifting/sliding devices 29*a*, 29*b*, 29*c*, and 29*d*, the first pushing devices 14*a* and 14*b*, as well as the second pushing devices 16*a* and 16*b* of said introducing device 3, it is possible to discharge the article 10 from the already introduced container 2. In other words, as in the case of the abovementioned introducing operation, the container 2 introduced with the article 10 is placed close to the stage 5, and the second lifting/sliding devices 29*a*, 29*b*, 29*c*, and 29*d* are pushed on the stage 5 into the container 2 using the second pushing devices 16*a* and 16*b* to bring the devices underneath the pallet 11 carrying the article 10 (shown in FIG. 8). Then pressurized air is introduced to the expanding members 21 of the first lifting/sliding devices 13*a*, 13*b*, 13*c*, and 13*d* as well as the second lifting/sliding devices 29*a*, 29*b*, 29*c*, and 29*d* to cause them to expand, consequently raising the pallet 11 from the floor 4 of the container 2 (shown in FIG. 7).

Next, the first pushing devices 14*a* and 14*b* that function as pulling device are activated to pull out the pallet 11 engaging the first pushing devices 14*a* and 14*b* at their edges. A pallet 11 is then pulled out to the specified position on the stage 5 by the second lifting/sliding devices 29*a*, 29*b*, 29*c*, and 29*d* as well as the first lifting/sliding devices 13*a*, 13*b*, 13*c*, and 13*d*. When the same discharging work for the rest of the article 10 is repeated and completed, the pressurized air is vented from the expanding members 21 of the first lifting/sliding devices 13*a*, 13*b*, 13*c*, and 13*d* as well as the second lifting/sliding devices 29*a*, 29*b*, 29*c*, and 29*d* to cause them to lower the pallet 11 to the floor of the stage 5. Then, the second lifting/sliding devices 29*a*, 29*b*, 29*c*, and 29*d* are pulled back to the side of the stage 5, thus completing the series of discharging operations of the article 10 from the container 2. Although the edges of the first pushing devices 14*a* and 14*b* that function as pulling devices are engaged with the pallet 11, it is preferable to connect the first pushing devices 14*a* and 14*b* with the pallet 11 using linking means such as wires. This is because the first pushing devices 14*a* and 14*b*, which functions as pulling devices, can be constructed more compact and simpler.

Although each pallet 11 is sequentially transported between the stage 5 and the container 2 in the lifted condition in the introducing and discharging operations of the article 10 in the first embodiment, all pallets 11 are lowered to the floor at the same time when the transportation of the pallet 11 is completed, whereby it is possible to lower each pallet 11 to the floor individually each time article is transported. The introducing operation under such a scheme will be described below. First, the second lifting/sliding devices 29*a*, 29*b*, 29*c*, and 29*d* are moved into the container 2, pressured air is introduced into the expanding members 21 of the first lifting/sliding devices 13*a*, 13*b*, 13*c*, and 13*d* as well as the second lifting/sliding devices 29*a*, 29*b*, 29*c*, and 29*d* to cause them to expand. Then a pallet 11 is brought to the specified position in the container 2 by pushing said pallet 11 by means of the first pushing devices 14*a* and 14*b* as shown in FIG. 2. Next, the pressurized air is vented from the second lifting/sliding devices 29*a*, 29*b*, 29*c*, and 29*d* to cause the device 20 to lower and make the pallet 11 land on the specified position in the container 2. Next the second lifting/sliding devices 29*a*, 29*b*, 29*c*, and 29*d* are pulled out from underneath the pallet 11 in the landed condition by contracting the second pushing devices 16*a* and 16*b*, and there are placed at the location in the container 2 suitable for introducing the next pallet 11. The introducing operation to the pallets 11 carrying the rest of the article 10 in a similar manner is repeated, thus completing the series of introducing operations.

It is also possible to constitute the expanding member of said lifting member 21 with other means such as a jack, linkage, gear mechanism, etc., to raise the rollers 20. It is also possible to use wheels or caterpillars in place of rollers 20. It is also possible to use the second lifting/sliding means 29*a*, 29*b*, 29*c*, and 29*d* of a self-propelled type and to make them move to the specified positions into the container 2 by means of computer control. Moreover, it is possible to make the second lifting/sliding means move to the specified positions in the container 2 by manual operation. Of many rollers 20 constituting the second lifting/sliding means 29*a*, 29*b*, 29*c*, and 29 arranged in the container 2, it is possible to apply a proper amount of rotary resistance to some of the rollers 20 in the deepest side of the container 2 (A-direction side of FIG. 2). With such an arrangement, it is possible to prevent the first article being introduced into the container 2 by means of the second lifting/sliding means 29*a*, 29*b*, 29*c*, and 29 from crashing against the end wall of the container as much as possible. Although the first lifting/sliding devices 13*a*, 13*b*, 13*c*, and 13*d* are made to be able to be lifted in the present embodiment, it is also possible to constitute them in such a way that the rollers 20 are secured to be always located at the lifted position (shown in FIG. 4). Moreover, it is possible to move the pallet 11 that carries the article in the lifted condition by means of the first lifting/sliding devices 13*a*, 13*b*, 13*c*, and 13*d* or the second lifting/sliding means 29*a*, 29*b*, 29*c*, and 29*d* by manual operation.

Although stage 5 has described as a permanently installed type, it can also be a self-propelled type. The adjustment mechanism for adjusting the height between the stage 5 and the container 2 can be provided on the stage-side and/or the container-side. It is possible to have leveling blocks on the ground as the height adjusting mechanism of the container-side, placing the container on leveling blocks, and adjusting the height. It is also possible to use the height adjustment mechanism that makes height adjustments only to the rear (opening part) of the container, or a mechanism that makes height adjustments to the front and rear parts of the container independently. Moreover, although it is possible to use a height adjustment mechanism that allows height adjustments for the container which is off the truck chassis. Also, although a dry container having an opening only at the rear is shown, the invention can be applied to a container with an opening on the side as well.

A single large article or long goods, as article, can be loaded on the pallet 11 that is modularized to ¼ or ½ of the total length of the container (e.g., 20 feet), while article consisting of multiple small items can be loaded by packing them on the pallet outside the container, so that efficient consolidation and loading of article can be substantially improved and manual work can now be automated thanks to the invention. It is preferable to use pallets that have screws provided in advance for lashing hooks and anchor bolts so that both heavy article and multiple smaller articles can be securely loaded and fastened. It is also preferable to use lighter and inexpensive pallets in order to save transportation costs.

It is also possible to use the carrying structure according to the present invention for carrying methods where container trucks are not used. For example, the carrying device according to the present invention can be used in such an application wherein a second stage is installed near said carrying device, lowers a container carried by a crane on said stage, loads a article to said container, and picks up the container with the crane to transfer to the intended transportation means. The loading device according to the present invention can be used in manufacturing plants, distribution centers and material handling facilities in harbors, etc. Article transfer to stages can be carried out by various handling means other than cranes. Moreover, it is possible to introduce the first and second lifting/sliding devices according to the first embodiment into the container, transport the container to the destination, and conduct discharging of the article at the destination using the first and second lifting/sliding devices.

(Second Embodiment)

(1) Structures of the Introducing/Discharging Device and the Introducing/Discharging Pallet In the second embodiment, the application to a case where a dry container is placed on the ground at a specified point in a harbor container yard and article loading is performed for this container placed on the ground.

Figure 9:
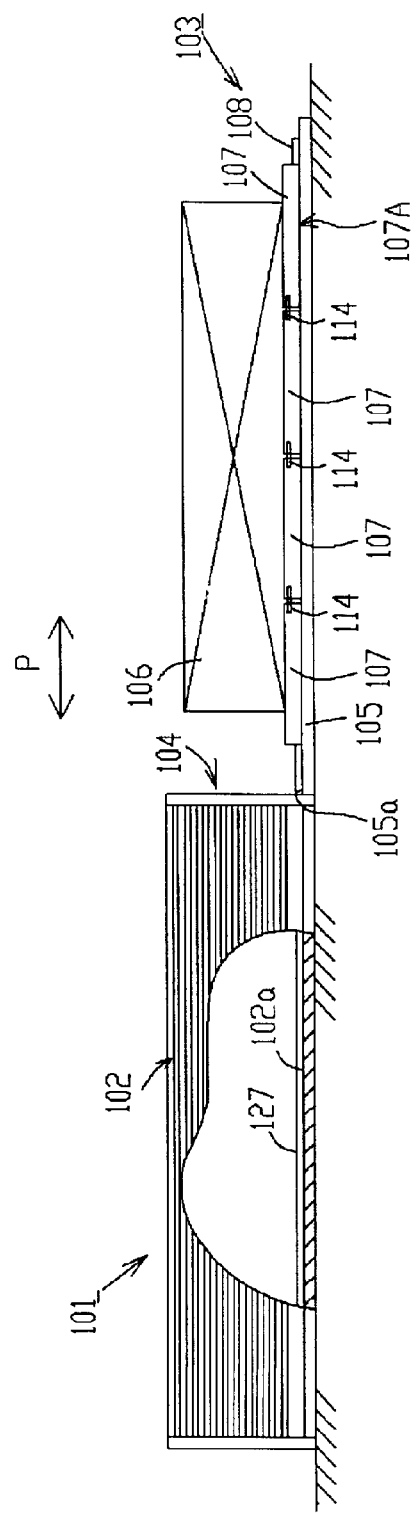
FIG. 9 is a partially broken side view of a dry container and an introducing/discharging device on which the introducing and discharging work for the pallet according to the second embodiment is performed.
Figure 10:
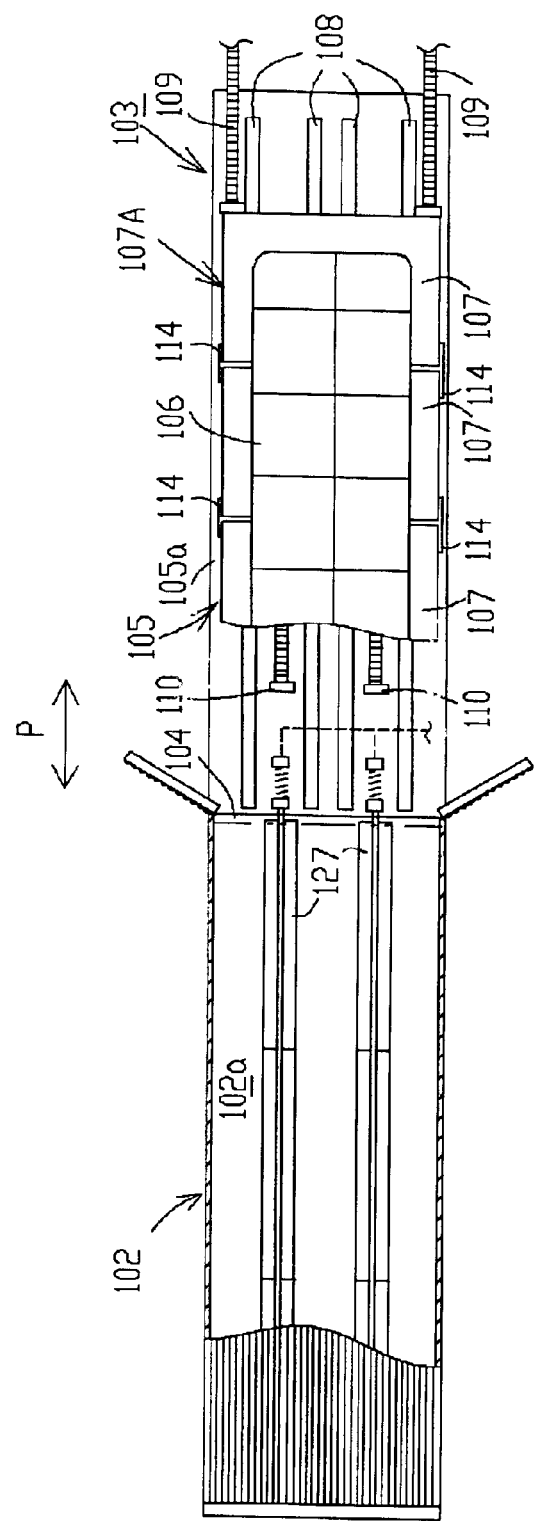
FIG. 10 is a partially broken plan view of FIG. 1.

As shown in FIGS. 9 and 10, an introducing/discharging device 103 for introducing or discharging a article introducing/discharging pallet according to this invention is provided at a specified location where a freight container 102 is placed. The introducing/discharging device 103 is constituted approximately similar to the one used in the first embodiment, and essentially consists of a stage 105 having a floor 105a with a height approximately equal to the height of a floor 102a of the container 102 placed on the ground and first and second lifting/sliding devices 108 and 127 that supports a introducing/discharging pallet 107 slightly above the floors 105a and 102a between the stage 105 and the container 102. The introducing device 103 is equipped with a pair of first pushing devices 109 that move the introducing/discharging pallet 107 in the introducing/discharging direction of the article 106 (shown by the arrow P in FIG. 9 and FIG. 10) by applying a displacing force and a pair of second pushing devices 110 that displaces said second lifting/sliding device 127 between the stage 105 and the container 102. It is also possible to use said second pushing device 110 for displacing the introducing/discharging pallet 107.

Figure 11:
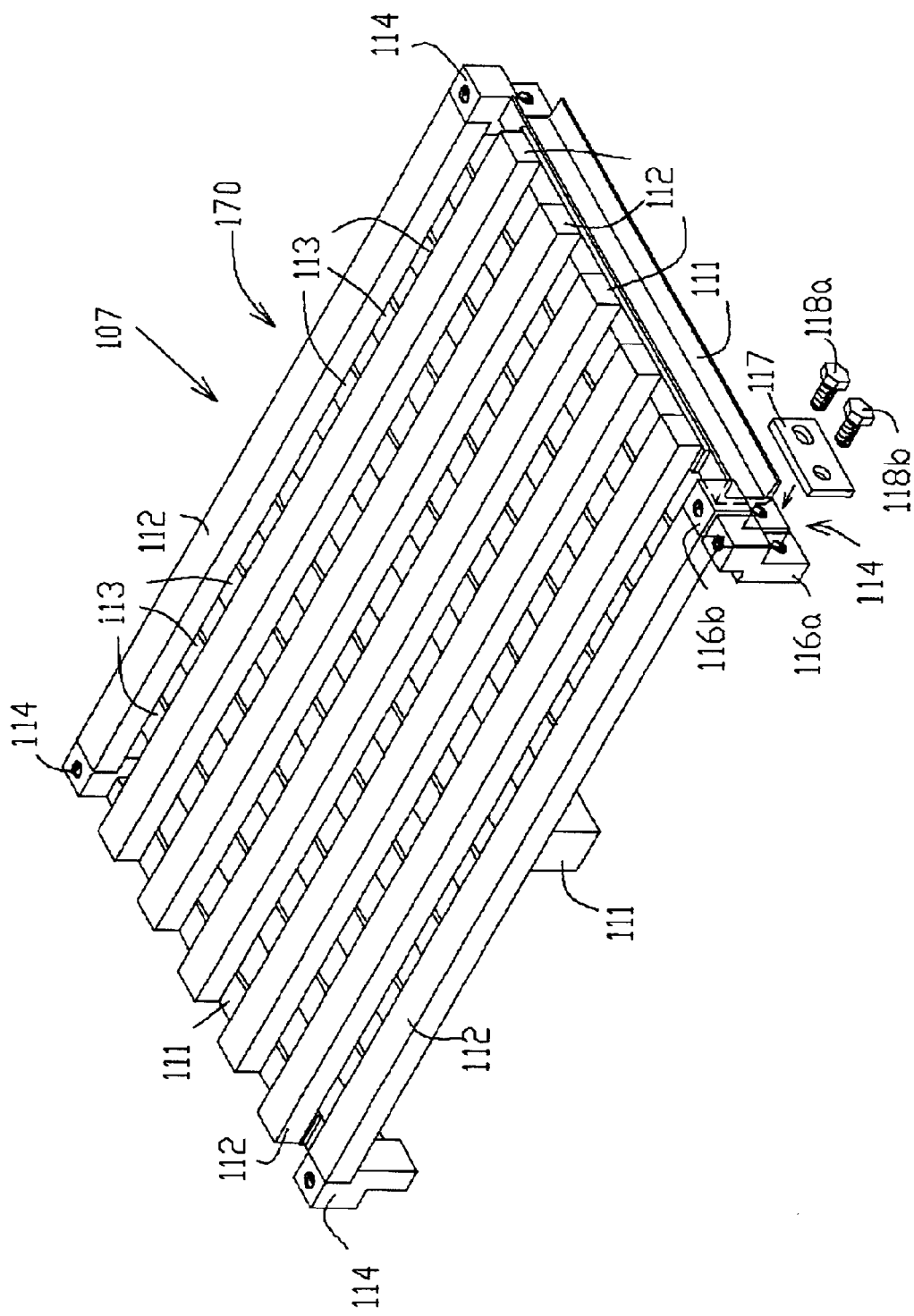
FIG. 11 is a perspective view of the pallet according to the second embodiment.
Figure 12:
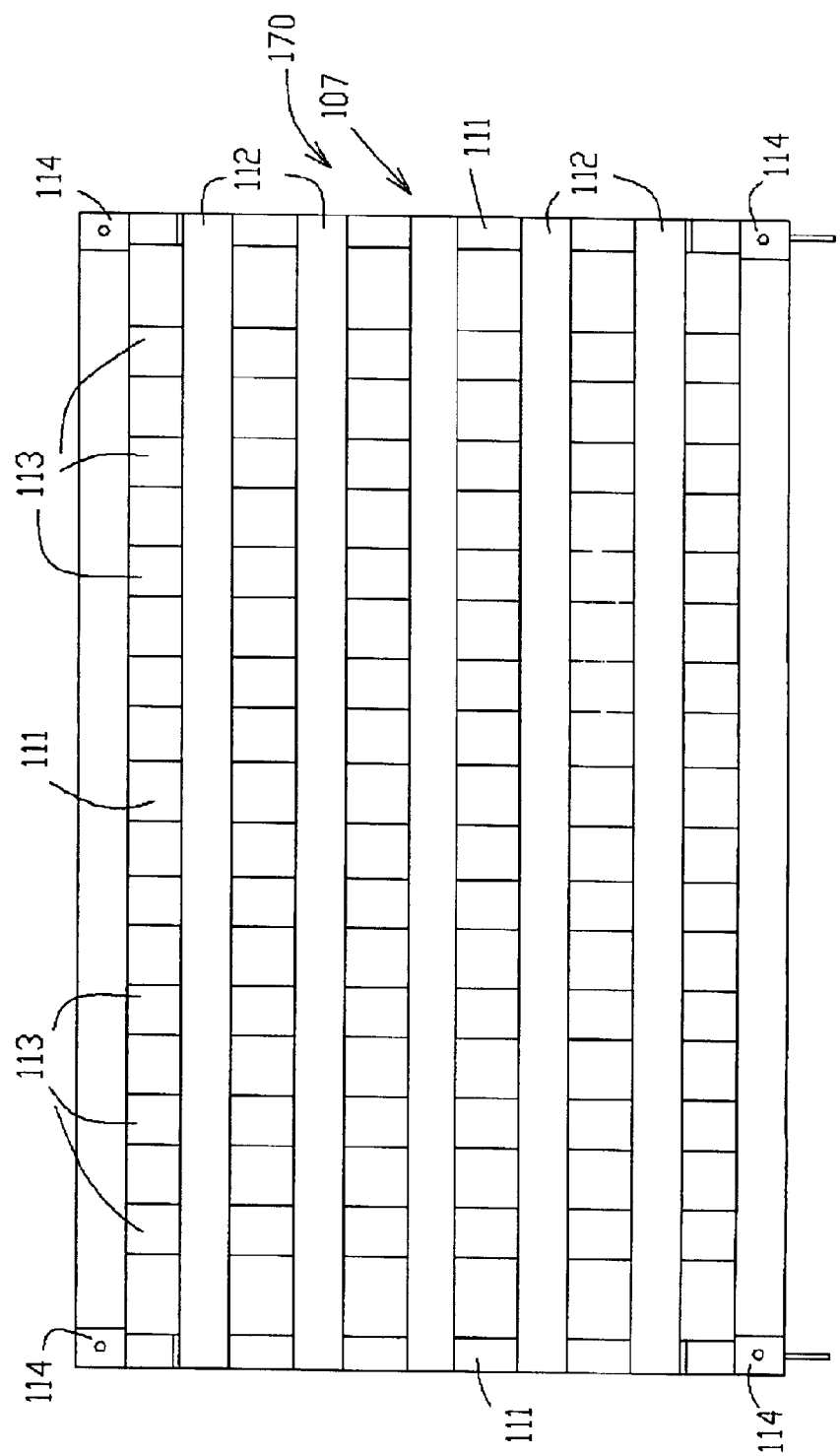
FIG. 12 is a plan view of the same.

Said introducing/discharging pallet 107 comprises a pallet main body 170 and connecting means to be described later as shown in FIGS. 11 and 12. The pallet main body 170 comprises three equally spaced beam-like base members 111 and multiple platform members 112 orthogonally arranged and affixed on said beam-like base members 111 in order to load said article 106 directly, thus forming a grid like structure having a rectangular article carrying surface with a larger width than the depth in the introducing direction of the article. The depth dimension of said introducing/discharging pallet 7 is set to a dimension, for example, approximately equal to one fourth of the depth length of a dry container with a total length of 20 feet and a width dimension of said introducing/discharging pallet 7 is set to a dimension approximating the width of the dry container.

Several load bearing members 113 are affixed on the back surface of said platform members 112 of the introducing/discharging pallet 107 between adjacent beam-like base members 111, and a specified space S is formed underneath the load bearing members 113. The first and second lifting/sliding devices 108 and 127 can be stored in said space S (shown in FIG. 13 and FIG. 14). Connecting means 114 are provided at four corners of the introducing/discharging pallet 107 for connecting with other introducing/discharging pallets similarly modularized as the introducing/discharging pallet 107.

Figure 13:
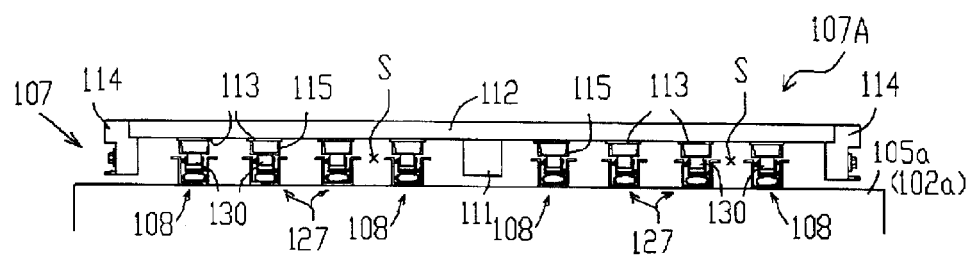
FIG. 13 is a front view of the same.
Figure 14:
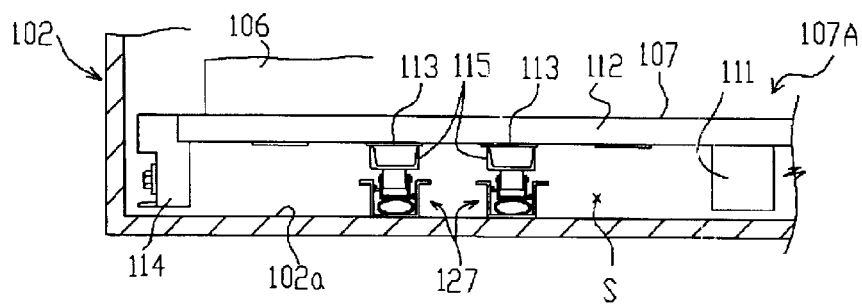
FIG. 14 is an enlarged view of essential parts showing the pallet being lifted above the floor of the container.

Said load bearing members 113, as shown in FIG. 13, perform the function as support for weights of said platform members 112 plus the weight of the article 106 by abutting with the top parts of the first and second lifting/sliding devices 108 and 127 when the first and second lifting/sliding devices 108 and 127 installed on the stage 105 support the introducing/discharging pallet 107 from underneath, and the rail when the introducing/discharging pallet 107 slides over the first and second lifting/sliding devices 108 and 127. In order to lighten the introducing/discharging pallet 107 further, the load bearing members 113 are designed to have a necessary minimum shape and structure and are preferably made of a plate material. In a case where it is inevitable to have a space between the top of the first and second lifting/sliding device 108 and 127 and the load bearing member 113, a spacer 115 made of channel steel, for example, can be provided between them.

Figure 16:
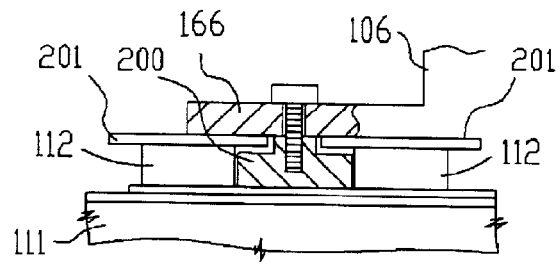
FIG. 16 is a broken side view of essential parts of the pallet.
Figure 17:
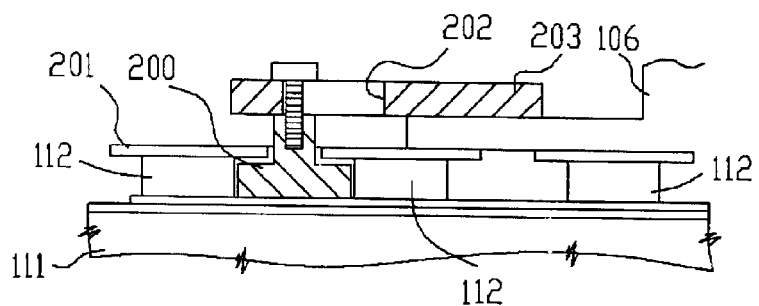
FIG. 17 is a broken side view of essential parts of the pallet.

The introducing/discharging pallet 107 can be equipped with fastening pieces 200, as shown in FIG. 16, with fastening holes provided on the top. The fastening pieces 200 are provided in a space defined by a pair of adjacent platform members 112 and restricting plates 201 attached to the top surface of each platform member 112. Therefore, the fastening pieces 200 are slidable along the longitudinal direction of the platform members 112 and are prevented from being pulled out upward by the restricting plates 201. When a machine tool is to be loaded as the article 106 on the introducing/discharging pallet 107, the fastening pieces 200 are moved to slide to proper positions to align with through holes formed on an anchor frame 166 of said machine tool so that the fastening pieces 200 and the anchor frame 166 can be fastened by screws. In order to supplement fastening pieces 200, it is also possible to use clamping pieces 203, each of which having an oblong hole 202 as shown in FIG. 17 adjusting said clamping pieces 203 along the platform members 112 as well as in a direction perpendicular to the longitudinal direction of the platform members 112.

Figure 18:
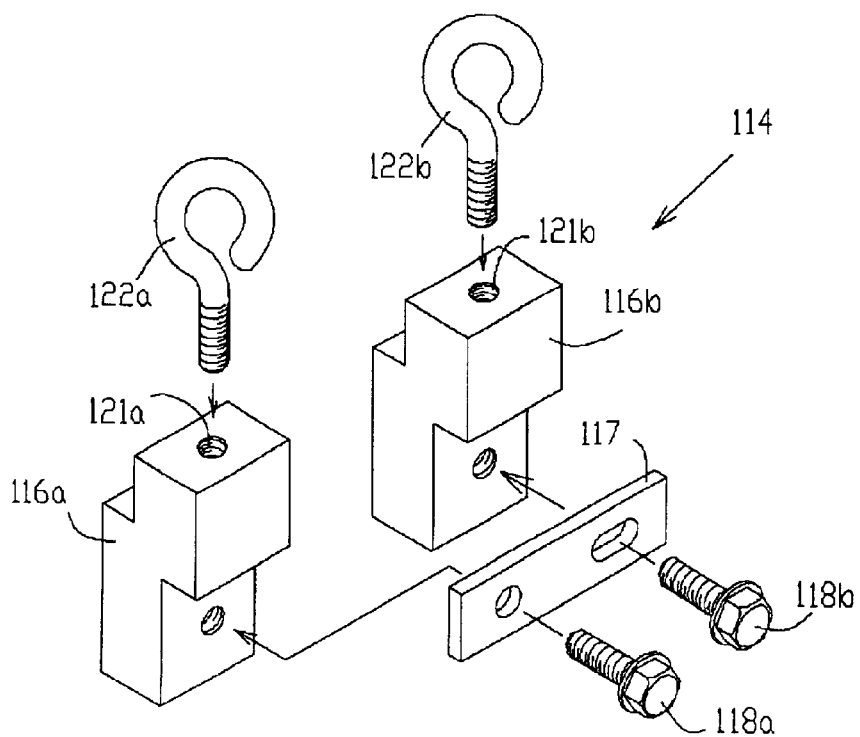
FIG. 18 is a partially broken perspective view of a connecting means.

While it is possible to use said connecting means 114 of arbitrary types as long as they can connect multiple modularized introducing/discharging pallets 107, a combination type shown in FIG. 18 is used in this embodiment consisting of a pair of stepped block base members 116a and 116b, which are welded and fixed to both ends of said beam-like base members 111 on the outside of each corner of the introducing/discharging pallet 107, a plate-like connecting member 117 that connects the stepped block base members 116a and 116b on the outside of the introducing/discharging pallets 107, and two bolts 118a and 118b that fix the ends of the connecting member 117 onto the stepped block base members 116a and 116b.

Figure 19:
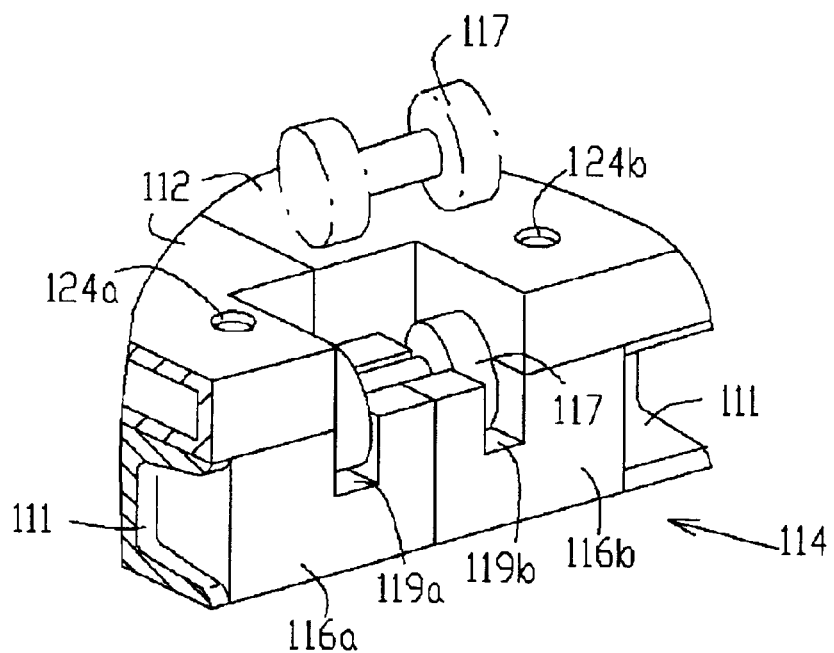
FIG. 19 is a partially broken perspective view of another aspect of the connecting means.
Figure 20:
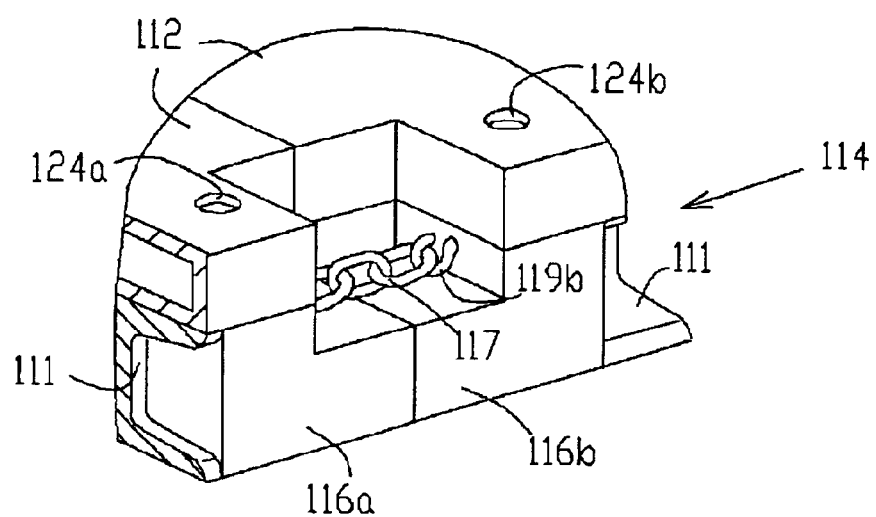
FIG. 20 is a partially broken perspective view of yet another aspect of the connecting means.

However, said connecting means 114 is not limited to such a combination type, but rather various other types can be used: for example, a type where a dumbbell-shaped connecting member 117 is dropped into latching parts 119a and 119b of the block base members 116a and 116b on the top side of the introducing/discharging pallet 107 to connect multiple introducing/discharging pallet 107 in order to form a pallet combination unit according to the present invention as shown in FIG. 19; or a type where a chain-like connecting member 117 is used, both ends of which being engaged with hook-like latching parts 119a (not shown) and 119b provided on the block base members 116a and 116b as shown in FIG. 20. In either case, the connecting means 114, in particular, connecting member 117, bolts 118a and 118b, latching parts 119a and 119b, etc., are built into the introducing/discharging pallet 107 in such a way as not to protrude outside of the outer beam-like base members 111 of the introducing/discharging pallet 107, and the connection and disconnection of the connecting member 117 with the block members 116a and 116b enable connection and disconnection of multiple units, that is, 2, 3 or 4 units of introducing/discharging pallets 107.

Figure 21:
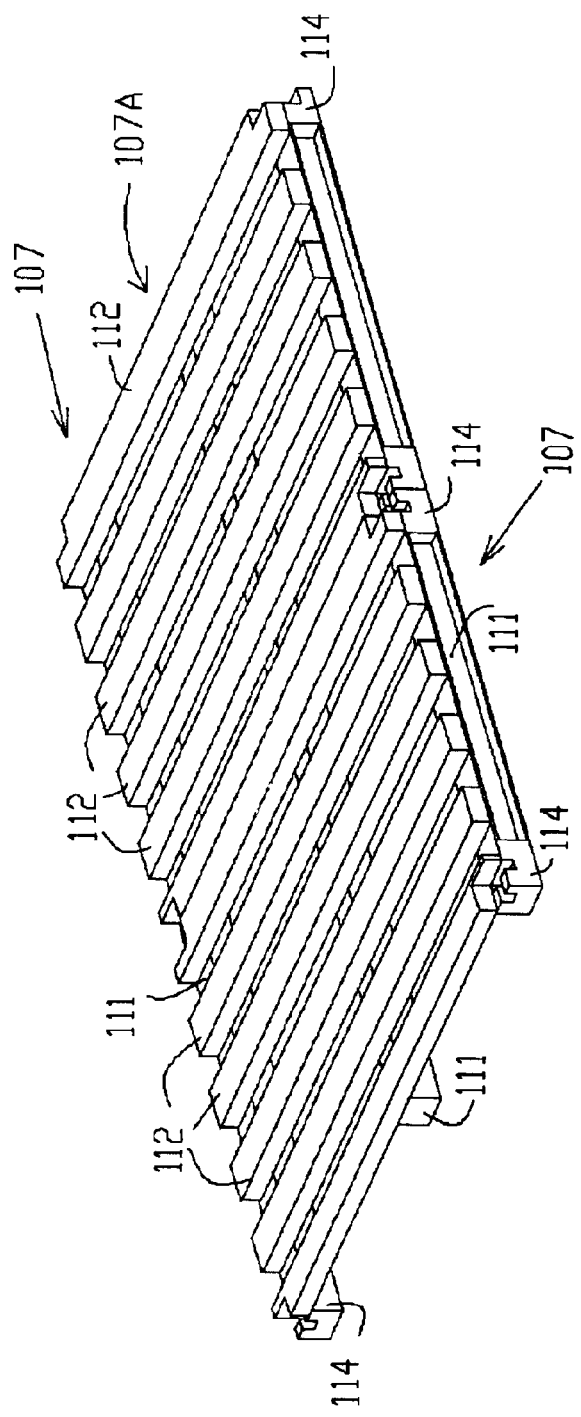
FIG. 21 is a perspective view of a pallet combination unit.

Multiple units of introducing/discharging pallets 107 are connected by means of said connecting means 114 to form a pallet combination unit 107A as shown in FIG. 21, and the article 106 is loaded on the pallet combination unit 107A. Various forms of loading are possible here, for example: a single unit or multiple units of article 106 can be loaded on a single introducing/discharging pallet 107, which is a component of the pallet combination unit 107A; or a single or multiple units of article 106 are laid out over the entire pallet combination unit 107A connecting introducing/discharging pallets 107.

Figure 22:
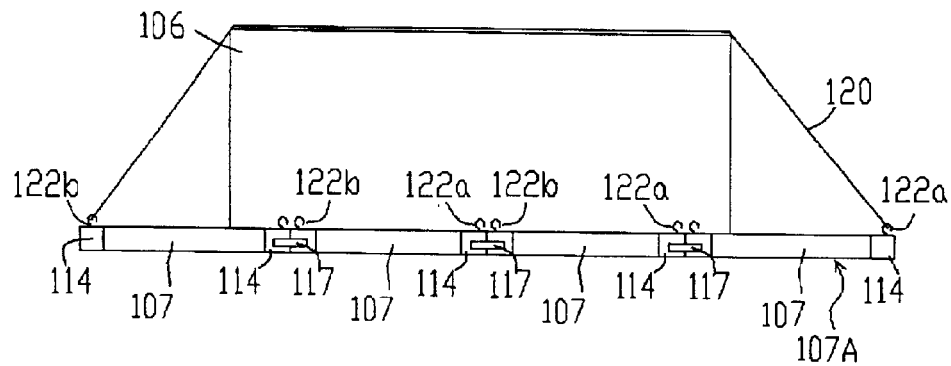
FIG. 22 is a descriptive diagram showing how heavy and bulky article can be mounted on the pallet combination unit.
Figure 23:
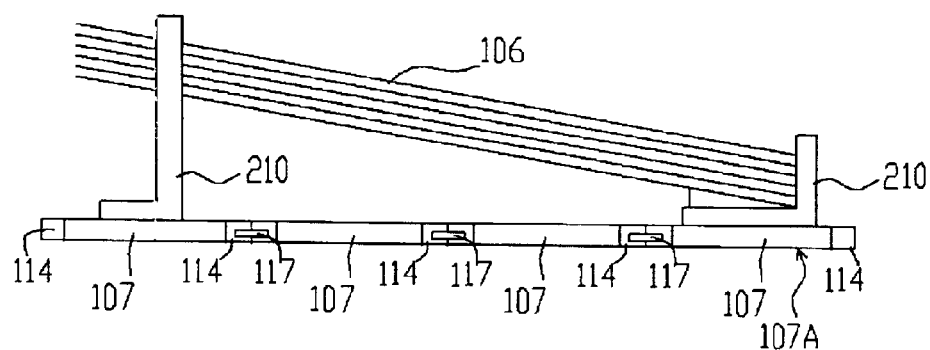
FIG. 23 is a descriptive diagram showing how long and bulky article can be mounted on the pallet combination unit.
Figure 24:
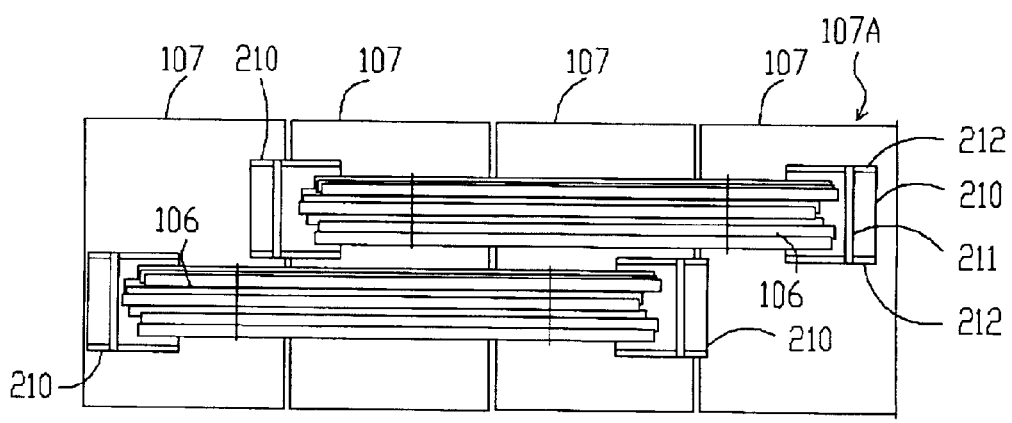
FIG. 24 is a descriptive diagram showing how long and bulky article can be mounted on the pallet combination unit.

The mode of loading various articles on the pallet combination unit 107A will be described below. As shown in FIG. 22, if the article 106 is heavy and bulky, a single piece of article 106 is loaded over four units of introducing/discharging pallets 107 that constitute the pallet combination unit 107A. Also, if the article's size is equivalent to one half of the total length of the container 102, each pieces of article is mounted across the two adjacent pallets in tandem (not shown). If the article 106 consists of long steel pipes, or something similar, which are slightly longer than the total length of the container 102, the article can be loaded in a tilted position using proper supports 210 as shown in FIG. 23. Also, if the article 106 is a long object but is slightly shorter than the total length of the container 102, the article 106 can be arranged at an angle and in two rows on the pallet combination unit 107A, the two rows overlapping each other according to the length as shown in FIG. 24. The supports 210 provided on the pallet combination unit 107A prevent long article from flying out in the transportation direction P. The supports 210 are supported by slide rails 212 and can slide along the rail, while slide limiting members 211 are adjustable along the longitudinal direction.

Figure 25:
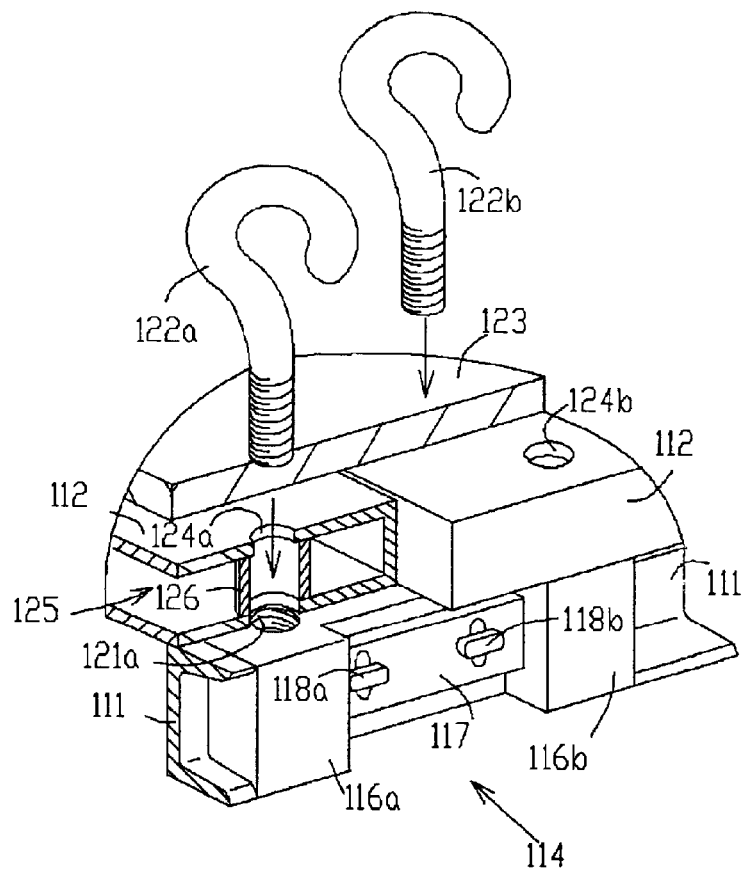
FIG. 25 is a partially broken perspective view of the connecting means in another aspect of usage.

If there is a concern that the article 106 may be disrupted on the introducing/discharging pallet 107 during a long trip of the container 102, female screws 121a and 121b can be provided on said block base members 116a and 116b as shown in FIG. 25 and hooks 122a and 122b are screwed into those female screws 121a and 121b, so that the article 106 can be fixed via hooks 122a and 122b using lashing materials 120 such as fixing ropes, wires, and nets as shown in FIG. 22. These female screws 121a and 121b as well as hooks 122a and 122b can be used for lifting the introducing/discharging pallet 107 with a crane as well. As shown in FIG. 25, in covering the top surfaces of the block base members 116a and 116b with rectangular tube-like platform members 112, or covering the gaps of tube-like platform members 112 with another plate-like member 123, it is also possible to provide through-holes 124a and 124b in said rectangular tube-like platform members 112, and interpose short tube-like guide members 126 in cavities 125 of said rectangular tube-like platform members 112 in order to screw the hooks 122a and 122b into the female screws 121a and 121b of the block base members 116a and 116b by guiding the ends of the female screws 121a and 121b through those through-holes 124a and 124b.

Figure 26:
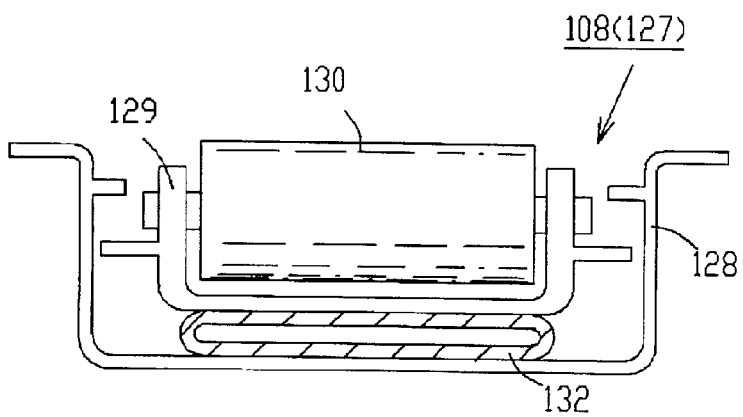
FIG. 26 is a partially broken front view of a lifting/sliding device.
Figure 27:
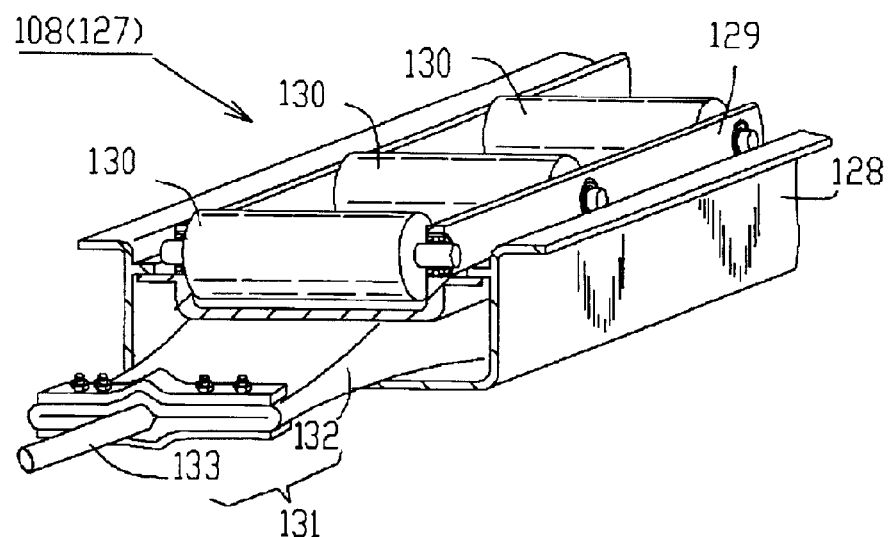
FIG. 27 is a partially broken perspective view of the same lifting/sliding device.

Next, the first and second lifting/sliding devices 108 and 127 used for moving said pallet combination unit 107A will be described, but detailed descriptions will be omitted as they constitute approximately the same first and second lifting/sliding devices of the first embodiment. As shown in FIG. 26 and FIG. 27, the first and second lifting/sliding devices 108 and 127 are both comprised of a base 128 having a substantially U-shaped vertical cross section, a supporting member 129 having a similar cross section that is to be dropped into the base 128, multiple rollers 130 as sliding members that are arranged parallel and pivotally to said supporting member 129 at a fixed interval, and an expanding member 131 that functions as a lifting member. Said expanding member 131 is comprised of a tube 132, which is reinforced by synthetic fiber cords, and a vent tube 133 that sends compressed air into said tube 132.

Figure 28:
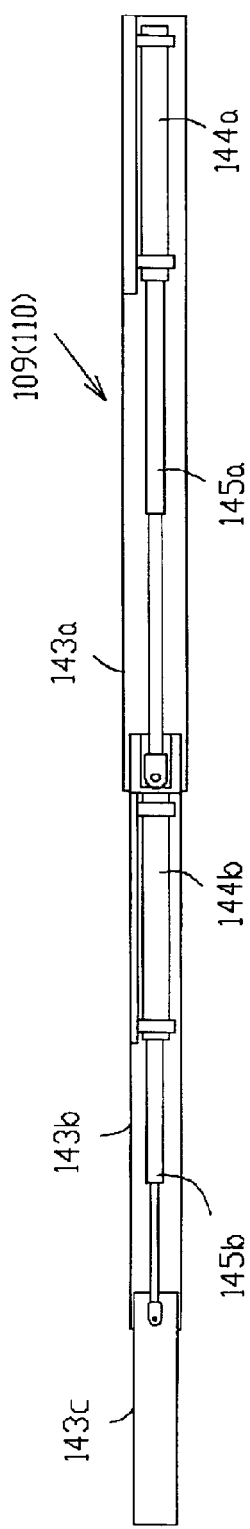
FIG. 28 is a plan view of an external force application means for pallet.

The first and second pushing device 109 and 110 can be constituted as shown in FIG. 28 by connecting multiple of rectangular cylindrical struts 143a, 143b and 143c with different cross section sizes in a telescopic manner, and installing extending rods 145a and 145b that can extend or contract by means of hydraulic cylinders 144a and 144b inside the struts, so that the struts 143a, 143b and 143c can extend or contract by means of extending and contracting the extending rods 145a and 145b.

Figure 29:
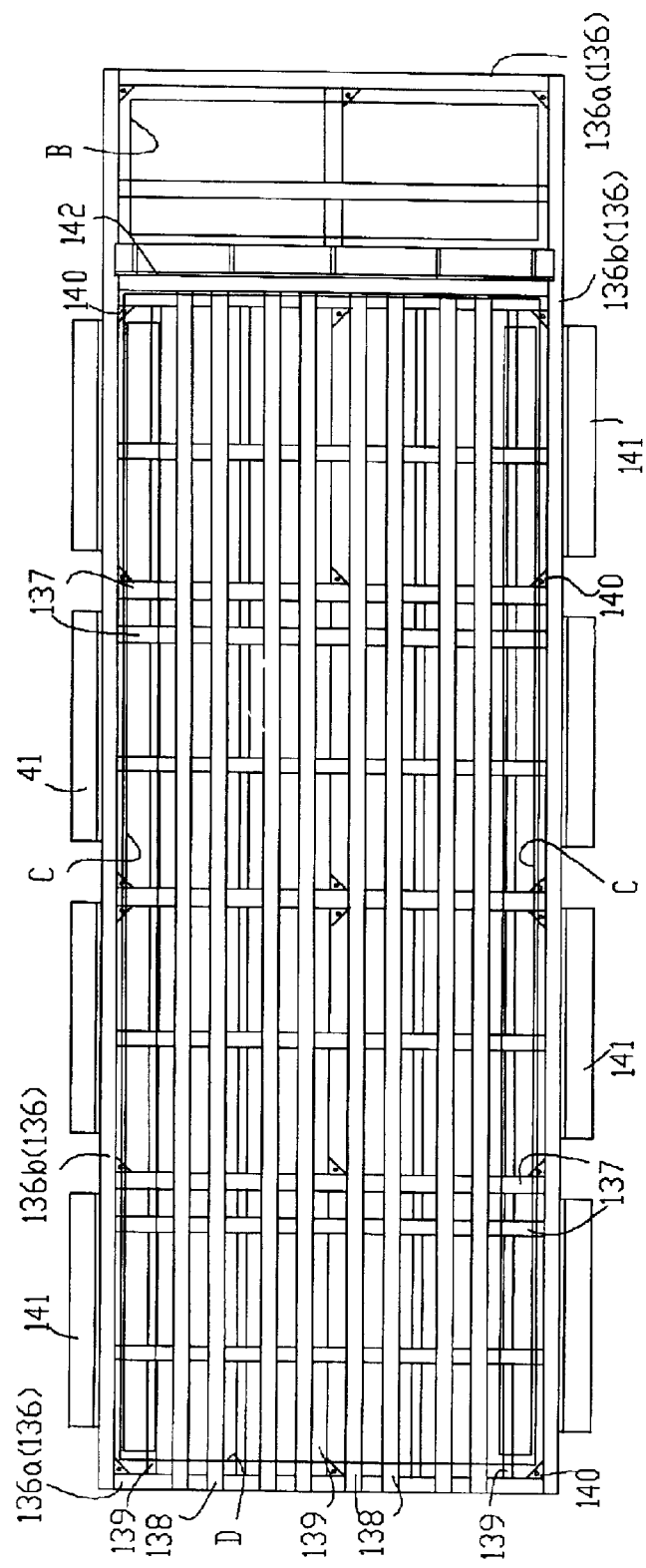
FIG. 29 is a plan view of a stage.
Figure 30:
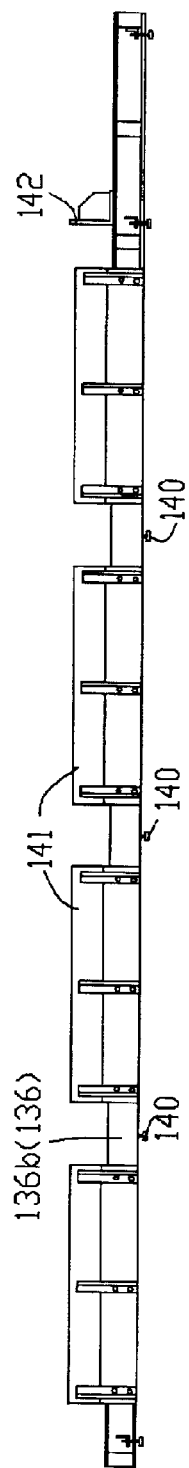
FIG. 30 is a side view of the same stage.

Said stage 105 can be a grid-like structure, as shown in FIG. 29 and FIG. 30, consisting of a rectangular frame-like base member 136 made of shaped steels, short side base members 137 that are assembled parallel to short side frame-like base members 136a of the frame-like base member 136, upper long side base members 138 that are assembled above the short side base members 137 and parallel with long side frame-like base members 136b of the frame-like base member 136, and lower long side base members 139 that that are assembled below the short side base members 137 and parallel with long side frame-like base members 136b.

The stage 105 has an area approximately equal to that of the floor 102a of the container 102 and is constructed so as to accumulate structures connecting four introducing/discharging pallets 107. An installation area B for installing the first pushing device 109 is provided in the front area that is adjacent to the opening 104 of the container 102 and rear area that is opposite 102a. An installation area C for installing the first pushing device 109 and others is provided close to the long side base frame member 136b. An installation area D for installing the first and second lifting/sliding devices 108 and 127 and others for the entire area of the stage 105 are provided.

In addition, level adjusting means 140 are provided at the corner of frame-like base member 136, the cross point between the long side frame base members 136b and the short side base members 137, and the cross point between the short side base members 137 and the upper long side base members 139 so as to adjust the horizontal level of stage 105 to the floor 102a of the container 102. Stopper members 141 and 142 are provided on the outside of the long side frame members 136b and between the installation area B and the rear installation area D of the introducing/discharging pallet 107 so as to prevent the introducing/discharging pallet 107 from extending out of the stage 105. A guide can be provided on one end of the stage adjacent to the container in order to guide the motion of the second lifting/sliding device 127.

(2) Introducing/Discharging Operations Using the Introducing/Discharging Devices and the Introducing/Discharging Pallet The operations of introducing and discharging the article 106 to/from the container 102 using of a pallet combination unit 107A formed by connecting four introducing/discharging pallets 107 of said introducing/discharging device 103 and 104 with connecting means 114 will be described below with reference to FIG. 31 through FIG. 36. The container 102 has arrived at the destination by transportation means such as a container truck, freight car, or ship, etc., and the pallet combination unit 107A inside the container 102 is loaded with the article 106. However, in some cases, there may be no article 106 on the pallet combination unit 107A inside the container 102.

Figure 15:
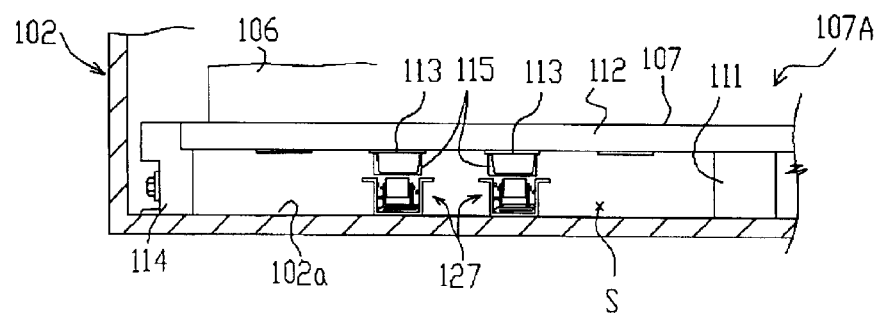
FIG. 15 is an enlarged view of essential parts showing the pallet being lowered to the floor of the container.
Figure 31:
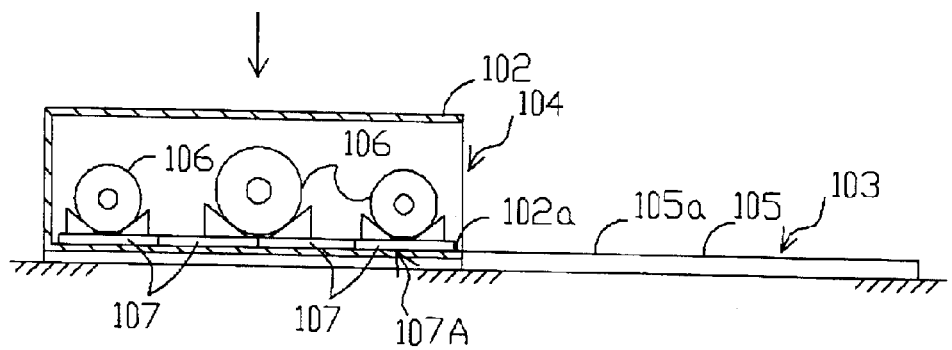
FIG. 31 is a descriptive diagram showing a discharging operation using the pallet combination unit.

First, the container 102 introduced with the pallet 107A loaded with the article 106 is transferred to the ground using a crane, etc., as shown in FIG. 31. Simultaneously, the container 102 is so positioned that its opening 104 is aligned with the leading edge of the stage 105 on the introducing/discharging device 103. The second lifting/sliding device 127 on the stage 105 is pushed into the container 102 by means of the second pushing device 110 and stored into the space S of the pallet combination unit 107A placed on the floor 102a of the container 102 (shown in FIG. 15). Next, compressed air is supplied into the tubes 135 of the first and second lifting/sliding devices 108 and 127 to lift the rollers 130. The pallet combination unit 107A will then be supported by the rollers 130 via the load bearing members 113 and the spacers 115, and its beam-like base members 111 will lift off the floor 102a of the container 102 (shown in FIG. 14).

Figure 32:
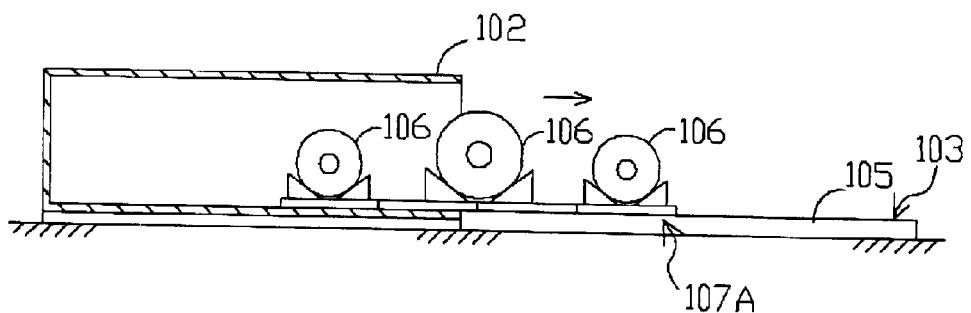
FIG. 32 is a descriptive diagram showing the same discharging operation.
Figure 33:
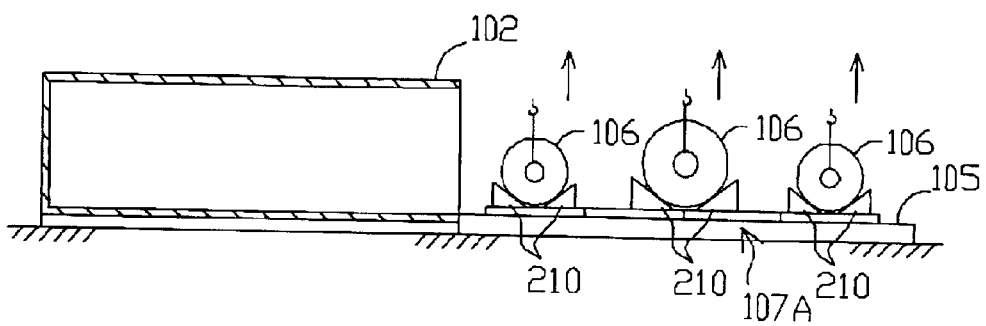
FIG. 33 is a descriptive diagram showing the same discharging operation.

Next, as shown in FIG. 32, the leading edge of the first pushing device 109 is latched in the extended condition with the pallet combination unit 107A, and contracts the first pushing device 109 to pull out the pallet combination unit 107A, sliding on the roller 130, out of the container 102 onto the stage 105. The article 106 transferred on the pallet combination unit 107A, which has been moved onto the stage 105, is the lifted using a crane, etc., to be placed on a specified position as shown in FIG. 33. When all of the article 106 have been transferred, the supports 210 attached to the introducing/discharging pallet 107 are removed, replace these supports shaped corresponding to the article 106 to be loaded next and mount hooks used for nets, ropes or the like for fastening article. Coiled goods that are shown as an example of article above have hitherto been transported after compiling a sufficient quantity in warehouses, etc., however, these can be shipped as a single item or as a small lot by freight container using the introducing/discharging pallets according to the present embodiment.

Figure 34:
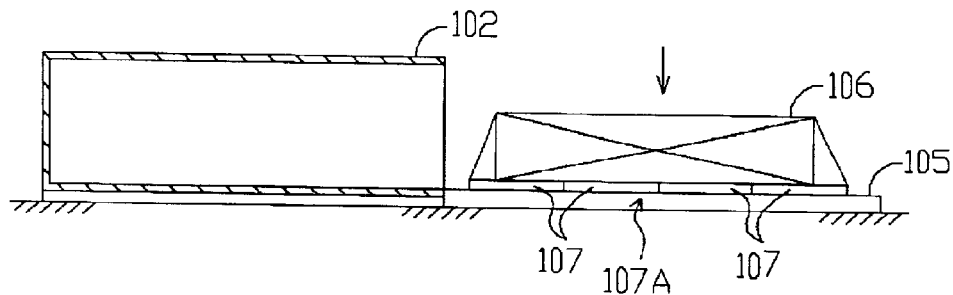
FIG. 34 is a descriptive diagram showing an introducing operation using said pallet combination unit.
Figure 37:
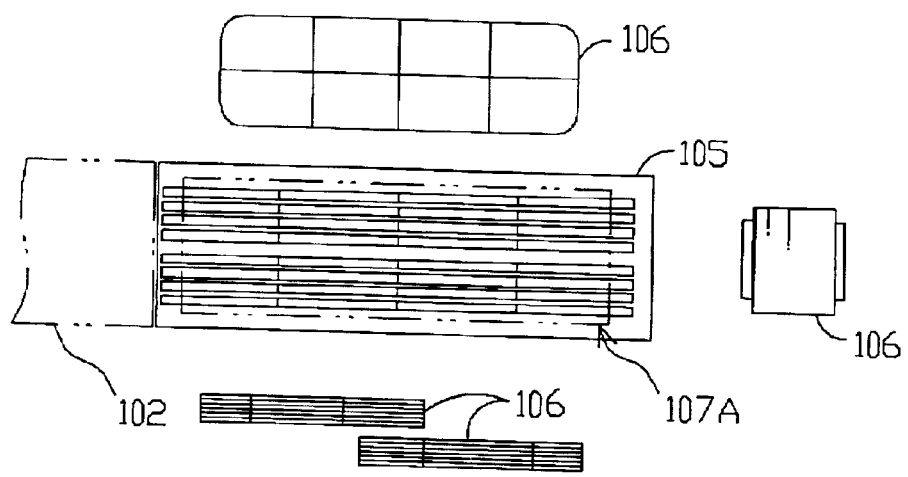
FIG. 37 is a descriptive diagram showing preparation conducted in advance of the introducing of article.

Next, as shown in FIG. 34, the next article 106 is transferred to the pallet combination unit 107A on the stage 105 using a crane, etc. As shown in FIG. 37, the article 106 scheduled to be transported is laid out around the stage 105 in such a way that the article 106 can be distributed on the pallet combination unit 107A in a proper balance considering its weight and shape.

Figure 35:
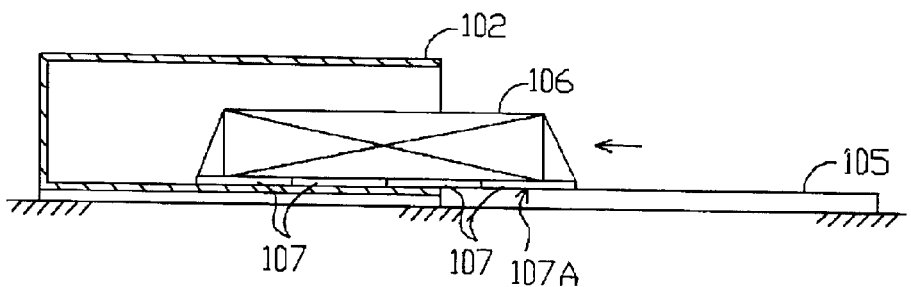
FIG. 35 is a descriptive diagram showing the same introducing operation.
Figure 36:
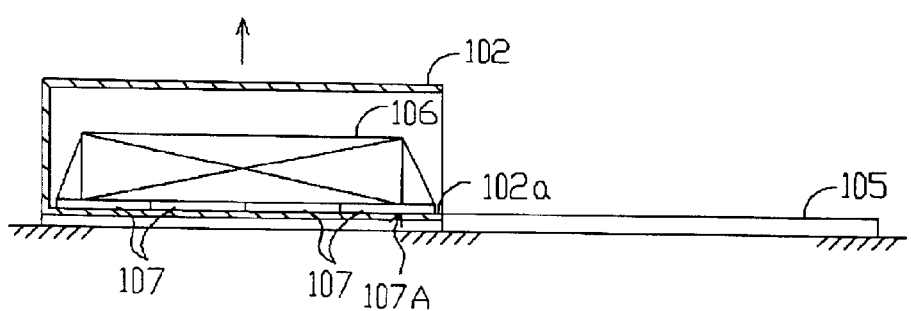
FIG. 36 is a descriptive diagram showing the same introducing operation.

Next, as shown in FIG. 35, the leading edge of the first pushing device 109 is latched in the contracted condition to the pallet combination unit 107A, and extends the first pushing device 109 to push the pallet combination unit 107A, sliding on the roller 130, into the container 102 from the stage 105. When the pallet combination unit 107A is completely introduced into the container 102 as shown in FIG. 36, the supply of the compressed air is stopped to the tube 135 of the first and second lifting/sliding device 108 and 127 to lower the rollers 130. Then, the pallet combination unit 107A is relieved from the support by the roller 130, the beam-like base members 111 rests on the floor 102a of the container 102 (shown in FIG. 15). Next, the second lifting/sliding device 127 on the floor 102a of the container 102 is pulled out using the second pushing device 110 to the original stage 105, and transfers the container 102 to the side of the transportation means from a position close to the stage 105 using a crane, etc., thus completing the series of introducing/discharging operations.

(3) Effect of the Second Embodiment

Consequently, the second embodiment makes it possible to conduct introducing/discharging operations of the article 106 between the container 102 and the stage 105 using the pallet combination unit 107A, which is formed by connecting multiple pallets by means of the connecting means 114, so that the number of processes of introducing/discharging the article 106 can be reduced depending on the number of connected introducing/discharging pallets, thus making the introducing/discharging operations more efficient. Moreover, in transporting the container 102 by transportation means such as a truck, freight car, ship, etc., the article 106 can be made more stable inside the container 2 as the introducing/discharging pallet is relatively larger. Further, since the heavy and bulky article 106 is loaded on the pallet combination unit 107A on the stage 105, not only can the introducing operation of the article 106 to the container 102 be done more smoothly, but also the introducing/discharging pallet 107 can be prevented from being over introduced and the leading and trailing ends of the article 106 can be prevented from sticking out and hitting the inner wall of the container 102. Moreover, even in the case of article consisting of multiple small items, these can be introduced by packing them on the pallet outside the container in advance, improving the efficiency of the consolidation and loading of article substantially.

In the second embodiment, after the article 106 introduced in the container 102 is discharged at the destination of the transported container, the emptied pallet combination unit 107A can be reused to introduce the article 106 to be transported to the next destination into the container 102 for transporting to the next destination or for shipping back to the original sender, so that there is no need to return the empty pallet combination unit 107A, thus reducing transportation costs and improving transportation efficiency. Such cyclical use of introducing/discharging pallets eventually of natural resources and contributes to the conservation of the global environmental.

It also makes it possible to arrange the next group of article 106 in the planned introducing sequence surrounding the stage 105 in advance, check the sequence easily and securely, and manage the article 106 more easily. Since introducing/discharging of the article 106 is carried out while the container 102 is placed on the ground, it is possible to maintain the container 102 in a stable leveled condition even if a heavy article is introduced, eliminating an otherwise cumbersome container leveling process. Thus, it can be said to fit for use in introducing work in distribution centers or C.F.S. (Container Freight Station) or the like where large quantities of various kinds of article are loaded. It also enables introducing of heavy and bulky article (such as large machine tools, large glass products, masonry products, and automobiles) which have been impossible or extremely cumbersome to introduce into a dry container 102.

The present invention can be executed not only in the aforementioned embodiments but also in many other ways modified according to various purposes and applications. For example, although it was suggested to use a pallet combination unit 107A with a size approximately matching that of the plane surface of the container 102 and to conduct a single introducing or discharging operation by means of the first pushing device 109 in the second embodiment, it is also possible to use pallet combination units 107A with a size approximately matching half the size of the plane surface of the container 102 and repeat the introducing or discharging operation twice respectively. The number of the introducing/discharging pallets 107 to be combined can be determined from the size, shape, weight, etc., of the article to be introduced or whether the introducing/discharging device 103 is available at the destination.

It is also possible to introduce or discharge the introducing/discharging pallets 107 in a disconnected condition to/from the container 102. In this case, it is possible to introduce the pallets by making multiple introducing/discharging pallets 107 abut with each other and push them into the container 102 together by means of the introducing/discharging device 103. In discharging the pallets, the introducing/discharging pallets 107 are to be pulled out one by one from the container 102, after which the article carried on each pallet 107 can be individually controlled or stored. It is also possible not to use said introducing/discharging device 103 at the destination of transportation, but rather prepare at least one pair of sliding means, insert said sliding means to the floor 102a of the container 102 resting on the ground through the lower opening space S of the introducing/discharging pallet 107, pull out the front introducing/discharging pallet 107 using a forklift, etc., withdraw the next and all other pallets 107 to the area near the opening 104 of the container 102 one by one using wires, etc., and pull out each pallet one by one using a forklift, etc., outside the container 102.

Figure 38:
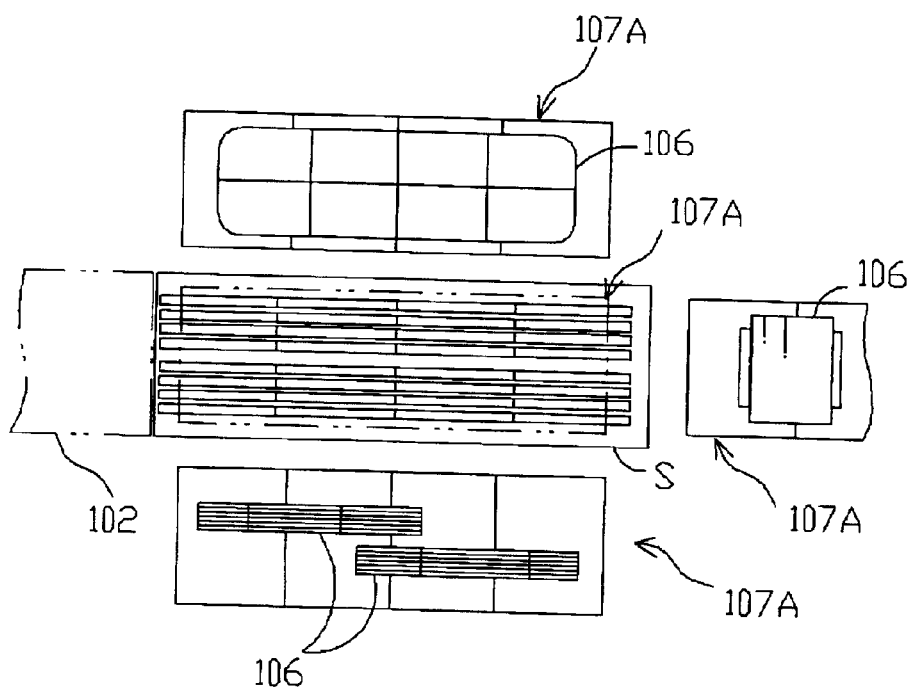
FIG. 38 is a descriptive diagram showing another aspect of preparation.

Although it was suggested in the second embodiment that the same pallet combination unit 107A is carried inside the container at all times, discharging and introducing of article is carried out in sequence using the same pallet combination unit 107A at the transportation destination, or the container carrying the empty pallet combination unit 107A is shipped to the next destination after the article is unloaded at the destination, it does not need to be limited to such schemes, but rather the pallet combination unit 107A can be unloaded together with the article 106 at the destination. In such a case, it is possible to prepare pallet combination units 107A loaded with article 106 to be shipped next placing around the stage 105 as shown in FIG. 38. Also, by disconnecting the connecting means 114 of a pallet combination unit 107A pulled out from a container 102, article carried on each introducing/discharging pallet 107 can be individually controlled or transferred.

The stage 105 can also be used for a line operation. That is, a packaging line that can transfer the introducing/discharging pallet 107 or the pallet combination unit 107A is sequentially installed in the stage 105, whereby it is possible to conduct loading of article on the introducing/discharging pallet 107 or the pallet combination unit 107A, fastening of article, or preparation work for the article to be shipped next on this packaging line. It is also possible to connect the stage 105 and a packaging area with a pallet transfer line, and conduct loading of article on the introducing/discharging pallet 107 or the pallet combination unit 107A, fastening of article, or preparation work for the article to be shipped next on the packaging line.

Figure 39:
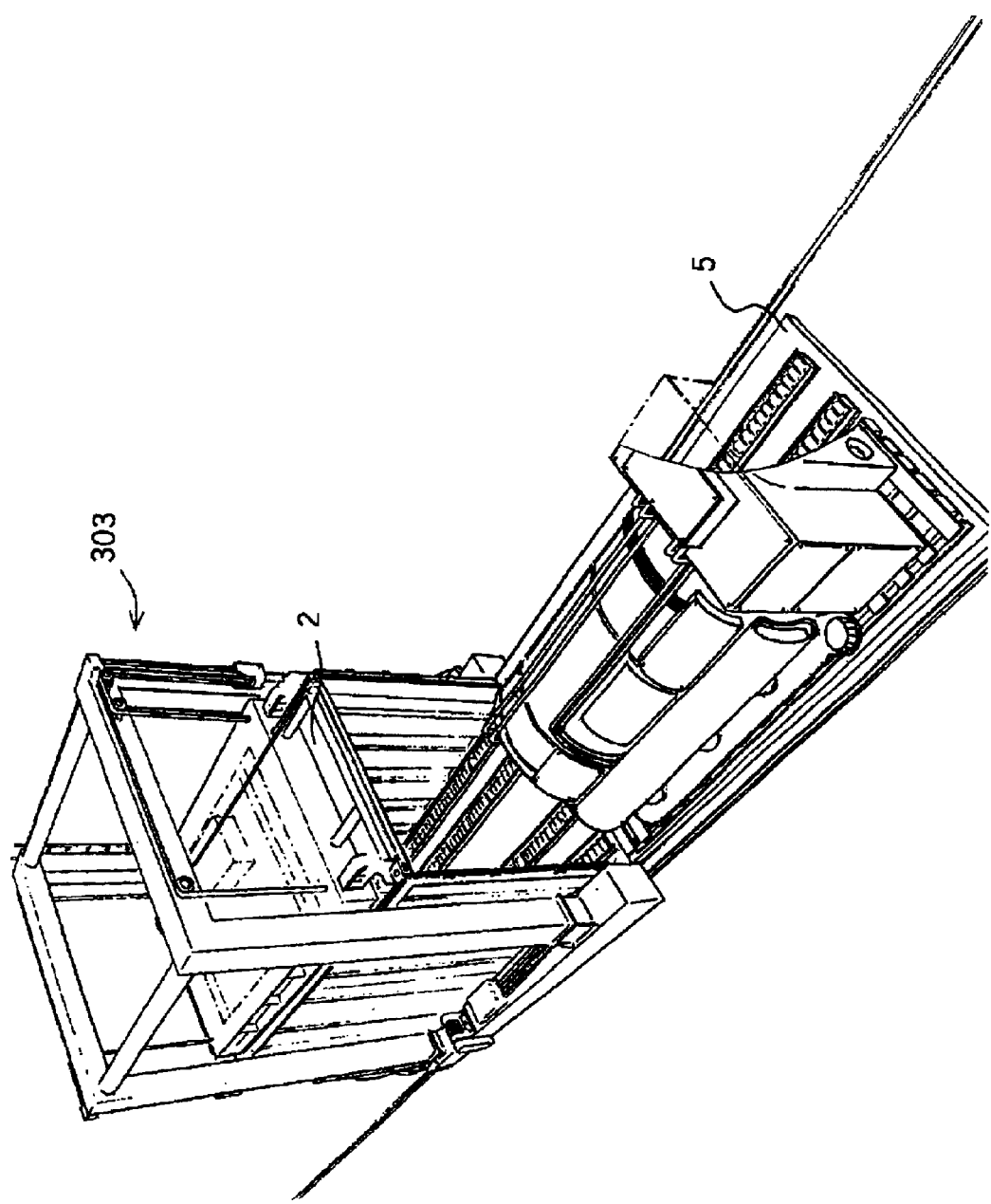
FIG. 39 is a descriptive diagram showing how a container is being unloaded from a truck chassis.

Although it was assumed in the second embodiment to lower the container 102 from the transportation means to the ground using a crane, etc., the invention is not to be limited to this. For example, if a container truck is used as the transportation means, the side lifter of the container truck can be used to bring the container 102 down to the ground. It is also possible, as shown in FIG. 39, to have a container transfer device 303 installed separately close to the stage 5, move the container truck into the container transfer device 303, clamp the four corners of the container 2 on the truck and lift the container with the lift mechanism, move only the truck away from the lift mechanism, and then lower the container 2 to the ground.

Although in the second embodiment it was assumed to conduct the introducing/discharging operation between the container 102 resting on the ground and the stage 105, the invention is not limited to this. For example, in a similar manner as in the first embodiment, it is possible to provide a stage with a floor height approximately matching the height of the floor 102a of the container 102 as it is loaded on a container truck as in the first embodiment, and conduct the introducing/discharging operation of the pallet combination unit 107A between the stage and the container on the truck. Moreover, it is possible to move the introducing/discharging pallet by hooking a chain equipped with a hook to the pallet instead of the first pushing device 109 in said embodiment. It is also possible to use a ball conveyor instead of the rollers 130. Further, although it was assumed in the second embodiment that the introducing/discharging device is to be used for both introducing and discharging operations, it can be used for only one of these.

(Other Embodiments)

Figure 40:
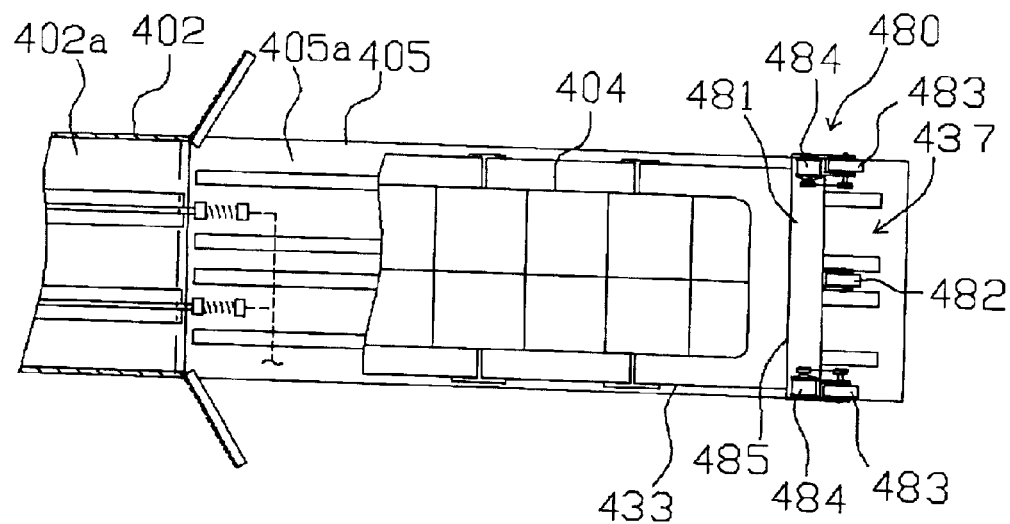
FIG. 40 is a plan view showing another aspect of an external force application means for pallet.
Figure 41:
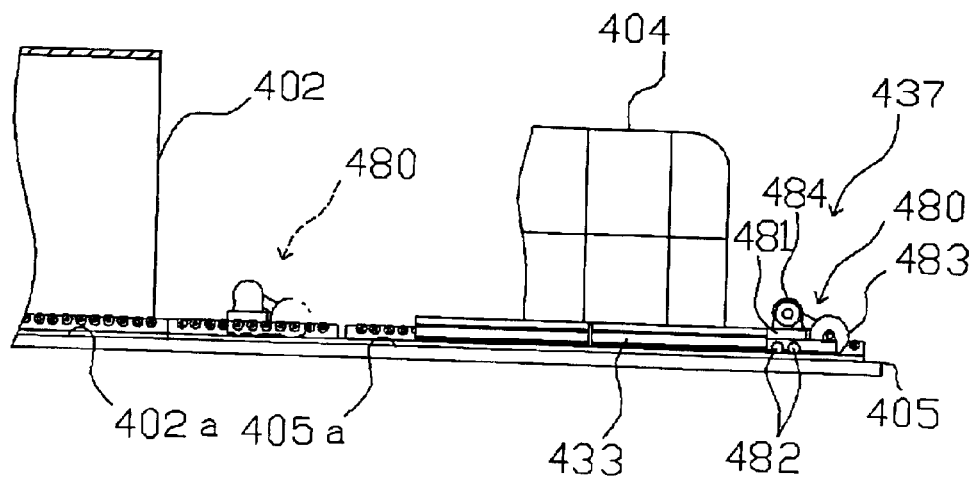
FIG. 41 is a side view of the same.

Although the first and second embodiments in the above have described an extendible boom mechanism as an external force application means for pallet, the invention is not to be limited to this. A rope which is wound or becomes self coiled by rotation of a motor, a chain winding device, a latching device that latches a rotating screw with a pallet, a roller conveyor device, a bending arm device, an extendible tube device, a self-propelled push-pulling device and other types of similar devices can constitute the external force application means for pallet. For example, as shown in FIG. 40 and FIG. 41, said self-propelled push-pulling device 437 can consist of a carriage 480 that can travel on a stage floor 405a of a stage 405. This carriage 480 can be constituted by installing passive wheels 482 and driving wheels 483 driven by a driving motor 484 on a flat member 481, and by further forming a latching unit 485 that can latch with a pallet 433 on the distal end of the flat member 481. Consequently, by making the carriage 480 travel on the stage floor 405a of the stage 405 with its latching unit 485 latched to the pallet 433, the pallet 433 is displaced between the stage floor 405a of the stage 405 and a container floor 402a of a container 402.

Figure 42:
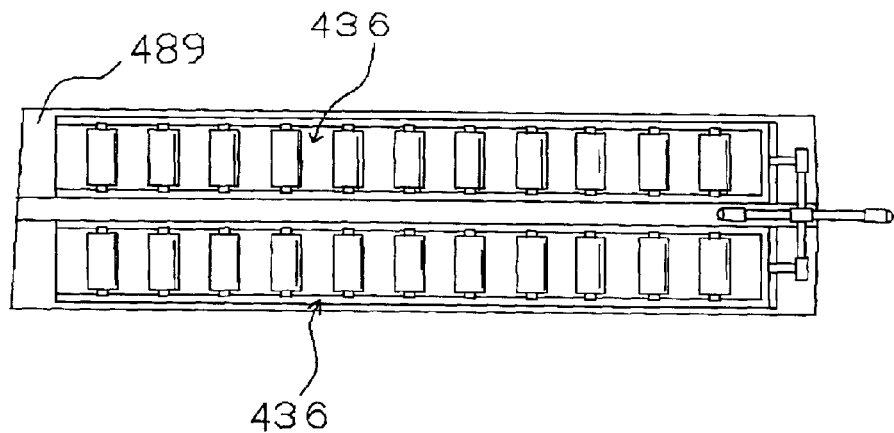
FIG. 42 is a plan view showing another aspect of a lifting/sliding device as a container-side displacement means.
Figure 43:
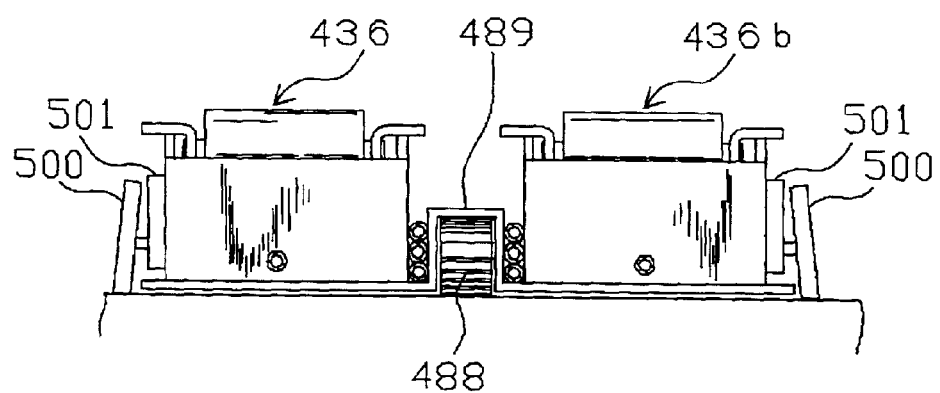
FIG. 43 is a front view of the same.

Moreover, as shown in FIG. 42 and FIG. 43, a lifting/sliding device as a container-side displacement means can be constituted by installing a pair of lifting/sliding devices 436, which are approximately similar to the one used in the first and second embodiments, on a base 489 parallel to each other, and by further installing underneath the base 489 an endless belt 488 and a pair of traveling wheels 500 on both sides, which can travel between the stage floor 405a of the stage 405 and the container floor 402a of the container 402. With such an arrangement, the displacement of the lifting/sliding device as the container-side displacement means can be smoothly conducted. Moreover, by rotatably supporting said traveling wheels 500 on the base 489 across a suspension mechanism 501, it is possible to allow the traveling wheels 500 to travel when rollers of the lifting/sliding devices 436 are not loaded, while making them incapable of traveling when the rollers are loaded. Thus, improved traveling linearity for the displacement of the lifting/sliding device can be achieved for the container-side displacement means even if there are some irregularities to the container floor. Moreover, said traveling wheels 500 can be installed so that the leading wheels in the traveling direction are provided with a toe-in camber angle. Therefore, even when the leading wheels rise above the surface due to irregularities of the container floor, stable traveling can be achieved as a result of supports provided by the trailing traveling wheels.

Figure 44:
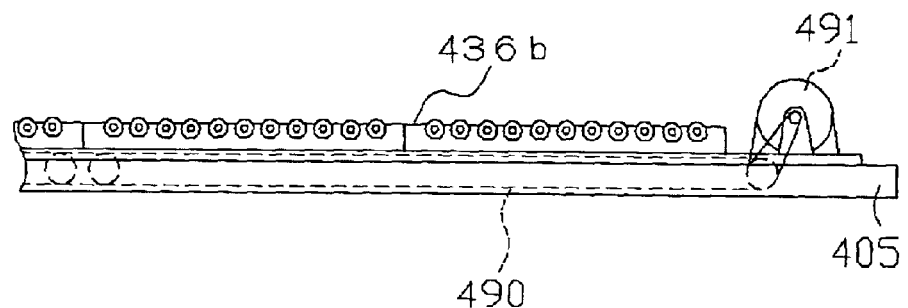
FIG. 44 is a side view showing another aspect of an external force application means.
Figure 45:
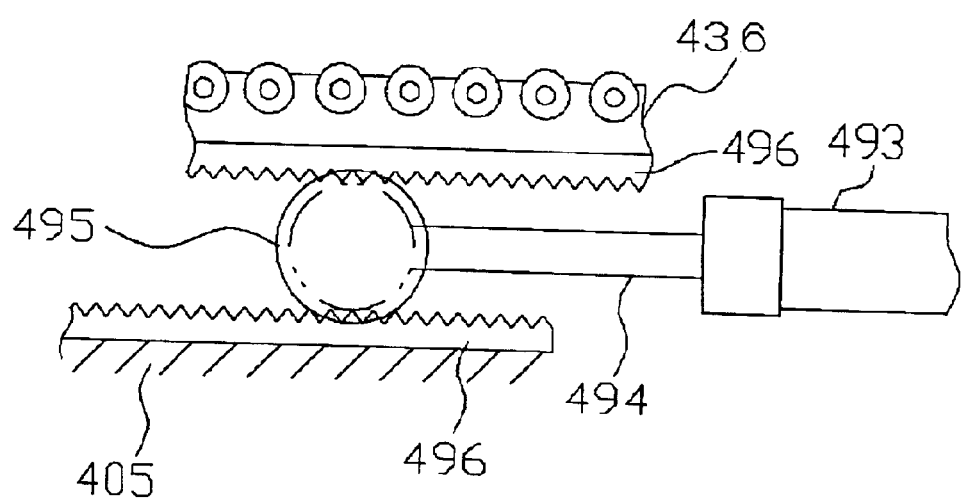
FIG. 45 is a side view showing yet another aspect of an external force application means.

Although said first embodiment has described an extendible boom mechanism as an external force application means, the invention is not to be limited to this. For example, as shown in FIG. 44, the external force application means can be equipped with a conveyor 490 that comprised of an endless belt or chain or the like supported to circulate independently inside the stage 405 and also a driving motor 491 that circulates the conveyor 490 so that this circulating conveyor 490 can displace the lifting/sliding device 436. Moreover, for example, as shown in FIG. 45, the external force application means can be comprised of a pinion 495 installed on the distal end of a piston rod 494 of a hydraulic cylinder 493 and racks 496 that are installed on both the lifting/sliding device 436 and the stage 405 so as to mesh with the pinion 495, so that the extending and contracting operation of this hydraulic cylinder can be transmitted by a rack-and-pinion mechanism so as to lace the lifting/sliding device 436.

What is claimed is:

1. Device for an carrying article into and from a dry container being characterized in comprising:
    a stage that is positioned close to one end opening of said dry container placed at a specific location and has a floor surface with a height approximately equal to a height of a floor surface of said dry container;
    a stage-side displacement means that is capable of lifting up and down a pallet loaded with article to said floor surface of said stage and supporting said pallet in such a way as to allow said pallet to move horizontally while keeping said pallet lifted up to said floor surface of said stage; and
    a container-side displacement means that is capable of lifting up and down said pallet to said floor surface of said dry container and supporting said pallet in such a way as to allow said pallet to move horizontally while keeping said pallet lifted up to said floor surface of said dry container;
    wherein said stage-side displacement means is a first lifting/sliding device including a first sliding member that supports said pallet in such a way as to allow said pallet to move horizontally and a first lifting member that lifts said first sliding member, wherein said container-side displacement means is a second lifting/sliding device including a second sliding member that supports said pallet in such a way to allow said pallet to move horizontally and a second lifting member that lifts said second sliding member, and wherein receiving said pallet while keeping said pallet lifted up to said floor surface of said stage or said dry container is possible between said stage-side displacement means and said container-side displacement means.

2. Device for carrying said article into and from said dry container according to claim 1, further comprising an external force application means for causing said pallet, which is supported in such a way as to be able to move horizontally by said stage-side displacement means, to move toward said dry container-side by applying an external force.

3. Device for carrying said article into and from said dry container according to claim 1, further comprising an external force application means for causing said pallet, which is supported in such a way as to be able to move horizontally by said container-side displacement means, to move toward said stage-side by applying an external force.

4. Device for carrying said article into and from said dry container according to according to claim 1, further comprising an external force application means that causes said container-side displacement means to move between said stage and said dry container by applying an external force to said container-side displacement means.

5. Device for carrying article into and from container according to claim 1 wherein said stage-side displacement means is a lifting/sliding device comprising a sliding member that supports said pallet in such a way as to allow said pallet to move horizontally and a lifting member that lifts said sliding member.

6. Device for carrying article into and from container according to claim 1 wherein said container-side displacement means is a lifting/sliding device comprising a sliding member that supports said pallet in such a way as to allow said pallet to move horizontally and a lifting member that lifts said sliding member.

7. Device for carrying said article into and from said dry container according to claim 1, wherein at least one of said first an second sliding members has multiple rollers arranged in parallel to each other.

8. Device for carrying said article into and from said dry container according to claim 1, wherein at least one of said first and second lifting members comprises an expanding member that is capable of pushing up a corresponding one of said first and second sliding members by expanding itself when air is introduced.

9. Device for carrying said article into and from said dry container according to claim 1, wherein said stage floor surface height is approximately equal to said dry container floor height when said dry container is installed on the ground.

10. Device for carrying said article into and from said dry container according to claim 1, wherein said stage floor surface height is approximately equal to said dry container floor height when said dry container is mounted on a chassis of a truck.

11. Device for carrying an article into and from a container, the device comprising:
    a stage that is positioned close to one end opening of said container placed at a specific location and has a floor surface with a height approximately equal to a height of a floor surface of said container;
    a stage-side displacement means that is capable of lifting up and down a pallet loaded with said article to said floor surface of said stage and supporting aid pallet in such a way as to allow said pallet to move horizontally while keeping said pallet lifted up to said floor surface of said stage; and
    a container-side displacement means that is capable of lifting up and down said pallet to said floor surface of said container and supporting said pallet in such a way as to allow said pallet to move horizontally while keeping said pallet lifted up to said floor surface of said container,
    wherein receiving said pallet while keeping said pallet lifted up to said floor surface of said stage or said container is possible between said stage-side displacement means and said container-side displacement means, and wherein said pallet includes a pallet main body, a connecting means that connects said pallet main body with a pallet main body of other pallet(s), and a bottom open space, which is open in a carrying direction, underneath said pallet, and is capable of forming a pallet combination unit that approximately matches a size of a floor space of said container by connecting with other pallet(s) as needed.

12. A method of introducing an article into a dry container characterized by:
    placing a pallet preloaded with said article to be transported on a floor surface of a stage of a device including:
        said stage being positioned close to one end opening of the dry container placed at a specific location and has a floor surface with a height approximately equal to a height of a floor surface of the container;

a stage-side displacement means that is capable of lifting up and down said pallet loaded with said article to said floor surface of said stage and supporting said pallet in such a way as to allow said pallet to move horizontally while keeping said pallet lifted up to said floor surface of said stage; and a container-side displacement means that is capable of lifting up and down said pallet to said floor surface of the dry container and supporting said pallet in such a way as to allow said pallet to move horizontally while keeping said pallet lifted up to said floor surface of the dry container;

wherein said stage-side displacement means is a first lifting/sliding device having a first sliding member that supports said pallet in such a way as to allow said pallet to move horizontally and a first lifting member that lifts said first sliding member, wherein said container-side displacement means is a second lifting-sliding device having a second sliding member that supports said pallet in such away as to allow said pallet to move horizontally and a second lifting member that lifts said second sliding member, and wherein receiving said pallet hue keeping said pallet lifted up to said floor surface of said stage or the dry container is possible between said stage-side displacement means and said container-side displacement means;

lifting up said pallet to said floor surface of said stage, moving said pallet toward the dry container placed at a specific location while keeping said pallet lifted up to said floor surface of said stage, and lowering said pallet to said floor surface of the dry container.

13. The method for introducing said article into the dry container according to claim 12, wherein said pallet is moved while keeping said pallet lifted up to said floor surface of said stage by multiple rollers, which are arranged in parallel to each other and pushed upward when compress air is introduced.

14. The method for introducing said article into the dry container according to claim 12, wherein said pallet comprises a pallet main body and a connecting means so that said pallet main body can connect with a pallet main body of other pallet(s) thus allowing to form a pallet combination unit by connecting with other pallet(s) that approximately matches a size of said floor space of the dry container, and said pallet combination unit is placed on said floor surface of said stage.

15. The method of introducing an article into a dry container according to claim 12, further comprising:

discharging said article from the dry container including:

placing the dry container at a specified position relative to a stage, lifting up said pallet loaded with said article to said floor surface of the dry container, moving said pallet toward said stage while keeping said pallet 1 lifted up to said floor surface of the dry container, and lowering said pallet to said floor surface of said stage.

16. The method for discharging said article from the dry container according to claim 15, wherein said pallet is moved while keeping said pallet lifted up to said floor surface of the dry container by multiple rollers, which are arranged in parallel to each other and pushed upward when compressed air is introduced.

17. The method for discharging said article from the dry container according to claim 15, wherein said pallet comprises a pallet main body and a connecting means so that said pallet main body can connect with a pallet main body of other pallet(s) thus allowing to form a pallet combination unit by connecting with other pallet(s) that approximately matches a size of a floor space of the dry container, and said pallet combination unit is placed on said floor surface of the dry container.

* * * * *